(12) United States Patent
Bok et al.

(10) Patent No.: US 11,042,241 B2
(45) Date of Patent: Jun. 22, 2021

(54) DISPLAY DEVICE INCLUDING TOUCH SENSOR AND DRIVING METHOD THEREOF

(71) Applicant: Samsung Display Co., Ltd., Yongin-Si (KR)

(72) Inventors: Seung Lyong Bok, Hwaseong-si (KR); Won Ki Hong, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/853,511

(22) Filed: Apr. 20, 2020

(65) Prior Publication Data

US 2020/0241696 A1 Jul. 30, 2020

Related U.S. Application Data

(63) Continuation of application No. 16/508,275, filed on Jul. 10, 2019, now Pat. No. 10,691,263, which is a continuation of application No. 14/741,236, filed on Jun. 16, 2015, now Pat. No. 10,394,387.

(30) Foreign Application Priority Data

Nov. 26, 2014 (KR) .................. 10-2014-0166826

(51) Int. Cl.
*G06F 3/044* (2006.01)
*G06F 3/041* (2006.01)
*G06F 3/042* (2006.01)

(52) U.S. Cl.
CPC ........ *G06F 3/04166* (2019.05); *G06F 3/0421* (2013.01); *G06F 3/0448* (2019.05); *G06F 3/0412* (2013.01); *G06F 3/0443* (2019.05); *G06F 3/0445* (2019.05); *G06F 3/0446* (2019.05)

(58) Field of Classification Search
CPC ....... G06F 3/0412; G06F 3/0421; G06F 3/044
USPC .................................. 345/170–178
See application file for complete search history.

(56) References Cited

U.S. PATENT DOCUMENTS

| 5,581,274 A | 12/1996 | Tagawa |
| 8,446,386 B2 | 5/2013 | Hamblin et al. |
| 8,735,899 B2 | 5/2014 | Yamazaki et al. |
| 8,736,162 B2 | 5/2014 | Jin et al. |

(Continued)

FOREIGN PATENT DOCUMENTS

| CN | 102893245 A | 1/2013 |
| CN | 103403652 A | 11/2013 |

(Continued)

OTHER PUBLICATIONS

Chinese Office Action Report, Application No. 201510388594.2 dated May 6, 2020, 12 pages.

*Primary Examiner* — Tony O Davis
(74) *Attorney, Agent, or Firm* — Innovation Counsel LLP

(57) ABSTRACT

A display device including a touch sensor and a driving method thereof, and more particularly, a curved display device including a touch sensor and a driving method thereof, are presented. The display device includes: a touch sensor unit including a plurality of touch sensors; and at least one touch surface curved to along a first direction, wherein the touch surface includes a center region and edge regions positioned at both sides of the center region along the first direction, and wherein a sensitivity of the touch sensor in the center region is higher than a sensitivity of the touch sensors in the edge regions.

20 Claims, 23 Drawing Sheets

(56) References Cited

U.S. PATENT DOCUMENTS

| | | | |
|---|---|---|---|
| 9,082,678 B2 | 7/2015 | Yamazaki et al. | |
| 9,360,971 B2 | 6/2016 | Barton et al. | |
| 9,529,481 B2 | 12/2016 | Barton et al. | |
| 9,639,228 B2 | 5/2017 | Barton et al. | |
| 9,791,981 B2 | 10/2017 | Kang | |
| 10,120,410 B2 | 11/2018 | Yamazaki et al. | |
| 10,347,700 B2 | 7/2019 | Yang et al. | |
| 10,373,586 B2 | 8/2019 | Ye et al. | |
| 10,394,387 B2 * | 8/2019 | Bok | G06F 3/04166 |
| 10,430,001 B2 | 10/2019 | Barton et al. | |
| 10,437,283 B2 | 10/2019 | Yamazaki et al. | |
| 10,474,186 B2 | 11/2019 | Yamazaki et al. | |
| 10,691,263 B2 * | 6/2020 | Bok | G06F 3/0421 |
| 2010/0013790 A1 | 1/2010 | Ahn et al. | |
| 2010/0085321 A1 | 4/2010 | Pundsack | |
| 2011/0248954 A1 | 10/2011 | Hamada et al. | |
| 2011/0304579 A1 | 12/2011 | Feng et al. | |
| 2012/0111479 A1 | 5/2012 | Sung et al. | |
| 2013/0034685 A1 | 2/2013 | An et al. | |
| 2013/0155052 A1 | 6/2013 | Ko | |
| 2013/0169548 A1 | 7/2013 | Kim et al. | |
| 2013/0194230 A1 | 8/2013 | Kawaguchi et al. | |
| 2013/0199311 A1 | 8/2013 | Horie et al. | |
| 2013/0234734 A1 | 9/2013 | Iida et al. | |
| 2013/0235011 A1 | 9/2013 | Lin et al. | |
| 2014/0002385 A1 | 1/2014 | Ka et al. | |
| 2014/0026713 A1 | 1/2014 | Bezuidenhout et al. | |
| 2014/0043263 A1 | 2/2014 | Park et al. | |
| 2014/0076063 A1 | 3/2014 | Lisseman et al. | |
| 2014/0267139 A1 | 9/2014 | Slaby et al. | |
| 2014/0306985 A1 | 10/2014 | Jeong et al. | |
| 2014/0347076 A1 | 11/2014 | Barton et al. | |
| 2015/0022475 A1 | 1/2015 | Watanabe et al. | |
| 2015/0035761 A1 | 2/2015 | Seo et al. | |
| 2015/0077370 A1 | 3/2015 | Kim et al. | |
| 2015/0097581 A1 | 4/2015 | Astley et al. | |
| 2015/0227233 A1 | 8/2015 | Yi et al. | |
| 2015/0261255 A1 | 9/2015 | Takeuchi et al. | |
| 2015/0277648 A1 | 10/2015 | Small | |
| 2015/0317019 A1 | 11/2015 | Lee et al. | |
| 2016/0147375 A1 * | 5/2016 | Bok | G06F 3/04166 345/175 |
| 2016/0299630 A1 | 10/2016 | Park et al. | |
| 2019/0113948 A1 | 4/2019 | Yamazaki et al. | |
| 2019/0332224 A1 * | 10/2019 | Bok | G06F 3/0421 |
| 2020/0241696 A1 * | 7/2020 | Bok | G06F 3/0421 |

FOREIGN PATENT DOCUMENTS

| | | |
|---|---|---|
| CN | 203950284 U | 11/2014 |
| JP | 2010-027266 A | 2/2010 |
| JP | 2012-043120 A | 3/2012 |
| JP | 2014-063159 A | 4/2014 |
| JP | 2014-115321 A | 6/2014 |
| JP | 2014-194720 A | 10/2014 |
| KR | 10-1113450 B1 | 1/2012 |
| KR | 10-2013-0126007 A | 11/2013 |
| KR | 10-2014-0129135 A | 11/2014 |
| KR | 10-1902006 B1 | 10/2018 |
| WO | 2011-142333 A1 | 11/2011 |

* cited by examiner

DISPLAY DEVICE INCLUDING TOUCH SENSOR AND DRIVING METHOD THEREOF

CROSS-REFERENCE TO RELATED APPLICATION

This application is a continuation application of U.S. patent application Ser. No. 16/508,275 filed on Jul. 10, 2019, which is a continuation application of U.S. patent application Ser. No. 14/741,236 filed Jun. 16, 2015 (now U.S. Pat. No. 10,394,387), which claims priority to and the benefit of Korean Patent Application No. 10-2014-0166826, filed on Nov. 26, 2014, in the Korean Intellectual Property Office, the disclosures of which are incorporated herein in its entirety by reference.

BACKGROUND

(a) Technical Field

The present invention relates to a display device including a touch sensor and a driving method thereof, and more particularly, to a curved display device including a touch sensor and a driving method thereof.

(b) Description of the Related Art

A display device such as a liquid crystal display (LCD), an organic light emitting diode (OLED) display, and an electrophoretic display includes a field generating electrode and an electro-optical active layer. For example, the OLED display includes an organic emission layer as the electro-optical active layer. The field generating electrode is connected to a switching element such as a thin film transistor to receive a data signal, and the electro-optical active layer converts the data signal into an optical signal to display an image.

Recently, such a display device may include a touch sensing function which can interact with a user in addition to a function of displaying the image. The touch sensing function is to determine touch information such as whether an object touches or approaches a screen and a touch position thereof by sensing a change in pressure, charges, light, and the like which are applied onto the screen in the display device, when the user writes a text or draws a figure by touching or approaching the screen with a finger or a touch pen. The display device may receive an image signal based on the touch information to display an image.

The touch sensing function may be implemented by a touch sensor. The touch sensor may be classified into various types such as a resistive type, capacitive type, electromagnetic (EM) type, and optical type.

Among the different types of touch sensors, the capacitive type touch sensor includes a plurality of touch electrodes that may transfer sensing signals. The touch electrode may form another touch electrode and a sensing capacitor (mutual-capacitor type), and form a sensing capacitor together with an external object (self-capacitor type). When a conductor such as a finger approaches or touches the touch sensor, a change is generated in the capacitance and/or the amount of charge in the sensing capacitor to determine whether a touch exists or not, a position of the touch, and the like.

A plurality of touch electrodes is disposed in a touch sensing region where a touch may be sensed to be connected to a plurality of touch wires transferring sensing signals. The touch wires may be positioned inside the touch sensing region and disposed in a non-sensing region around the touch sensing region. The touch wire may transfer a sensing input signal to the touch electrode or transfer a sensing output signal of the touch electrode generated according to a touch to a touch driver.

The touch sensor may be embedded in the display device (in-cell type), directly formed on an outer surface of the display device (on-cell type), or used by attaching a separate touch sensor unit to the display device (add-on cell type). The display device including the touch sensor determines information regarding whether a finger or a touch pen of the user approaches a screen and a touch position thereof to display images.

Generally, when a viewer views a flat panel display device, a viewing distance from the viewer to the center of the display device and a viewing distance from the viewer to the edge of the display device are different from each other. This difference in viewing distances causes a distortion in the image. In order to reduce image distortion and increase immersion in image, recently, a display panel of the display device is concavely or convexly curved. The display panel of the curved display device may be curved along at least one direction. Further, a curvature radius representing a bending degree may also vary according to the display device and a position of the display panel even in one display device.

The above information disclosed in this Background section is only for enhancement of understanding of the background of the invention and therefore it may contain information that does not form the prior art that is already known in this country to a person of ordinary skill in the art.

SUMMARY

When a curved display device includes a touch sensor, the surface of a display panel is curved, but a user may perform a touch as if touching a general flat-panel display panel without being aware of the curved surface of the display panel. In this case, the user may perform the touch along a virtual surface. However, when the touch surface is curved, a distance between a touching object and a touch surface of the display device varies depending on a position, especially if the "touch" does not include a physical contact. In particular, the touch may be achieved so that the distance between the touching object and the touch surface is longest at the center on the curved display panel and in this case, the touch may not be sensed accurately. That is, since the sensitivity of the touch sensor varies depending on the distance between the touching object and the touch surface, the touch sensitivity may deteriorate in a hovering touch mode at the center of the curved touch panel where the distance between the touching object and the touch surface is longest.

The inventive concept provides a display device that can sense a user's touch with uniform touch sensitivity along a curve direction of a display panel of a curved display device including a touch sensor even in a hovering touch mode and a driving method thereof.

An exemplary embodiment provides a display device including: a touch sensor unit including a plurality of touch sensors; and at least one touch surface curved along a first direction, wherein the touch surface includes a center region and edge regions positioned at both sides of the center region along the first direction, and wherein a sensitivity of the touch sensor in the center is higher than a sensitivity of the touch sensor in the edges.

The display device may further include a touch driver driving the plurality of touch sensors, wherein a sensing input signal which the touch driver inputs into the touch sensor in the center region has a higher voltage than a sensing input signal which the touch driver inputs into the touch sensors in the edge regions.

The touch sensor may include a first touch electrode, and an area of the first touch electrode in the center region may be different from an area of the first touch electrode in one or both of the edge regions.

The touch sensor may further include a second touch electrode forming a sensing capacitor with the first touch electrode, and an area of the second touch electrode in the center may be different from an area of the second touch electrode in the edge region.

The first touch electrode may extend in a second direction crossing the first direction, and the touch sensor may further include a second touch electrode crossing the first touch electrode.

An area ratio occupied by the plurality of first touch electrodes included in the plurality of touch sensors positioned in the center region may be different from an area ratio occupied by the plurality of first touch electrodes included in the plurality of touch sensors positioned in the edge region, wherein the area ratio is area occupied by first touch electrodes over total area of the region.

The plurality of touch sensors may include a plurality of first touch electrodes, and a distance between adjacent first touch electrodes which are in the center region may be different from a distance between adjacent first touch electrodes which are in the edge.

The first touch electrode may extend in a second direction crossing the first direction, and the touch sensor may further include a second touch electrode crossing the first touch electrode.

Each of the plurality of touch sensors may include a first touch electrode and a second touch electrode forming a sensing capacitor, and a distance between the first touch electrode and the second touch electrode which are adjacent to each other and positioned in the center region may be different from a distance between the first touch electrode and the second touch electrode which are adjacent to each other and positioned in the edge regions.

The touch sensor may further include an insulating layer positioned between the first touch electrode and the second touch electrode, and a thickness of the insulating layer included in the touch sensor in the center region may be different from a thickness of the insulating layer included in the touch sensor in the edge region.

A planar distance between the first touch electrode and the second touch electrode adjacent to each other in the center region may be substantially the same as a planar distance between the first touch electrode and the second touch electrode adjacent to each other in the edge region.

The display device may further include: a touch driver driving the plurality of touch sensors; and a plurality of touch wires connecting the touch driver and the plurality of touch sensors to each other, wherein in a direct touch mode, the touch driver applies a sensing input signal simultaneously to at least two touch sensors of the plurality of touch sensors in the center region.

The display device may further include a display panel displaying an image, wherein the touch sensor unit may be included in the display panel or positioned on a top surface of the display panel.

The display panel may be curved along the first direction on the touch surface.

The display device may include a first touch surface and a second touch surface.

The display device may further include a third touch surface positioned between the first touch surface and the second touch surface, wherein the third touch surface may be substantially flat.

A direction which the first touch surface and the second touch surface may face opposite directions.

The display device may further include: a first touch driver for driving sensing the touch sensor in the center region; and a second touch driver for driving the touch sensor in the edge region, wherein the first touch driver and the second touch driver may be included in different chips.

Another exemplary embodiment provides a driving method of a display device including a touch sensor unit including a plurality of touch sensors, at least one touch surface curved along a first direction, and a touch driver driving the plurality of touch sensors, including: receiving via the touch sensor a first sensing input signal, wherein the touch sensor is in the center region of the touch surface; and receiving via the touch sensor a second sensing input signal, wherein the touch sensor is in the edge region positioned next to the center region of the touch surface along the first direction, wherein a voltage of the first sensing input signal is higher than a voltage of the second sensing input signal.

According to exemplary embodiments presented herein, a touch can be sensed with constant touch sensitivity along a curved direction of a display panel of a curved display device including a touch sensor, even in a hovering touch mode.

DETAILED DESCRIPTION OF THE EMBODIMENTS

Figure 1:
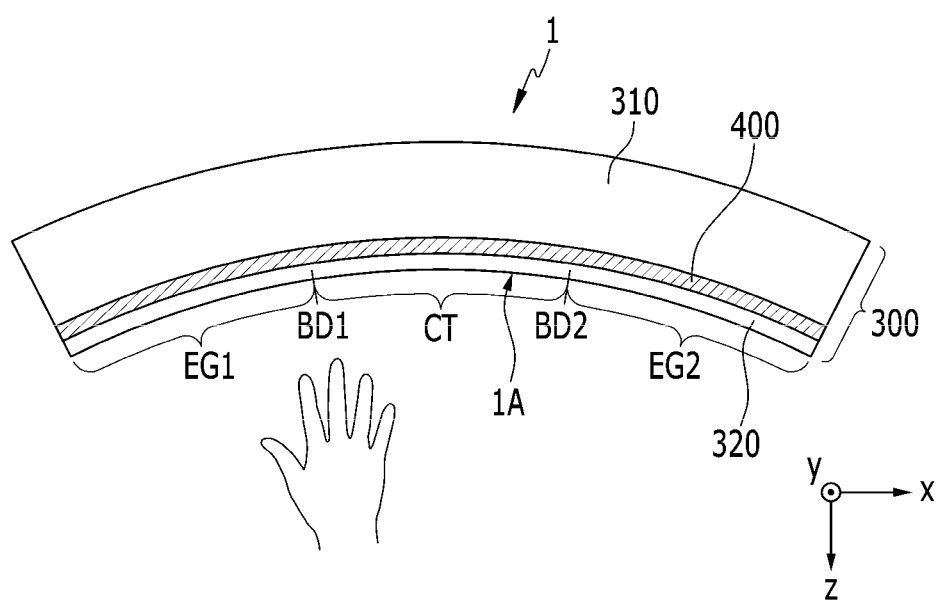
FIG. 1 is a schematic cross-sectional view of a curved display device according to an exemplary embodiment of the present inventive concept.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Throughout this specification and the claims that follow, when it is described that an element is "coupled" to another element, the element may be "directly coupled" to the other element or "electrically coupled" to the other element possibly through a third element. In addition, unless explicitly described to the contrary, the word "comprise" and variations such as "comprises" or "comprising", will be understood to imply the inclusion of stated elements but not the exclusion of any other elements.

Hereinafter, a display device according to an exemplary embodiment of the present invention will be described in detail with reference to the accompanying drawings.

First, a display device according to an exemplary embodiment of the present invention will be described with reference to FIGS. 1 to 3.

Figure 2:
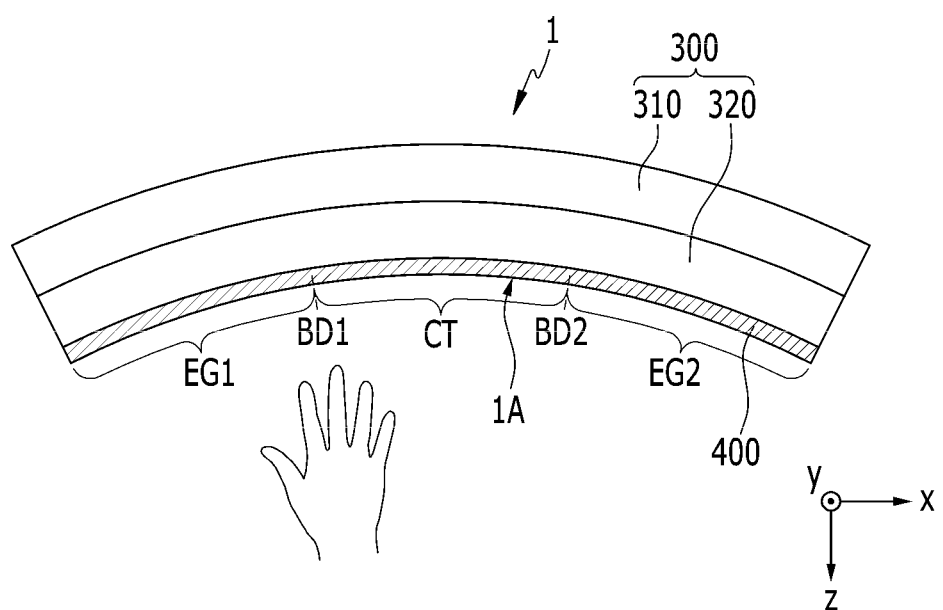
FIG. 2 is a schematic cross-sectional view of the curved display device according to the exemplary embodiment of the present inventive concept.
Figure 3:
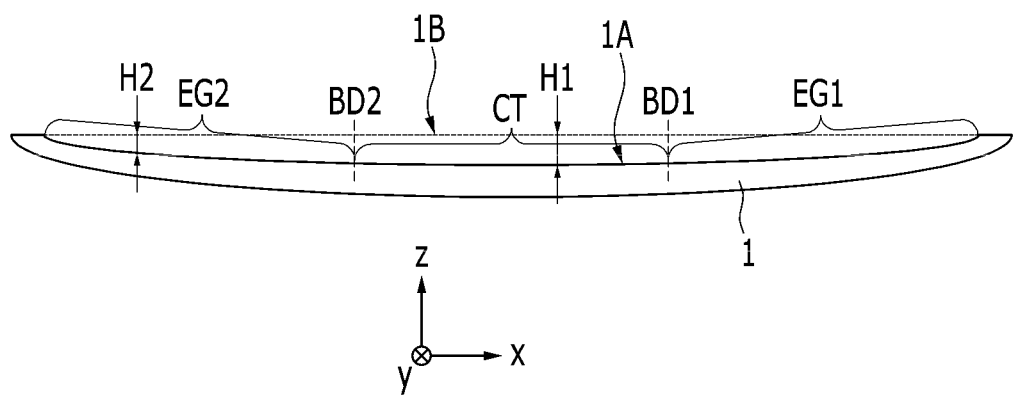
FIG. 3 is a cross-sectional view illustrating a touch surface and a virtual touch surface of the curved display device according to the exemplary embodiment of the present inventive concept.

FIG. 1 is a schematic cross-sectional view of a curved display device according to an exemplary embodiment, FIG. 2 is a schematic cross-sectional view of the curved display device according to the exemplary embodiment, and FIG. 3 is a cross-sectional view illustrating a touch surface and a virtual touch surface of the curved display device according to the exemplary embodiment.

Referring to FIGS. 1 and 2, a display device 1 according to the exemplary embodiment includes a touch sensor unit 400, and at least one touch surface 1A which is curved along an x-direction. The x-direction is herein referred to as "a first direction."

The touch surface 1A may be curved such that the center is farther from the plane of a viewer than the sides. This type of touch surface 1A is herein referred as "concave type." The touch surface 1A may have a predetermined constant curvature, or different curvatures according to positions. For example, the center region may have a different curvature than the sides of the touch surface 1A.

The touch surface 1A is a surface that an external object, such as a finger of the user, may touch. A "touch" includes not only a direct contact to the touch surface 1A but also a case where the external object approaches or hovers over the touch surface 1A. A touch driving mode in which touch information regarding the existence of the touch, a touch position, a touch intensity, and the like is sensed when the external object contacts the touch surface 1A, is referred to as a direct touch mode, and a touch driving mode in which the touch information is sensed when the external object approaches the touch surface 1A or hovers over it while approaching the touch surface 1A without actual contact is referred to as a hovering touch mode.

The touch sensor unit 400 is positioned below the touch surface 1A to sense the touch of the external object. The touch sensor unit 400 may include a touch sensing region in which a plurality of touch sensors is positioned to sense the touch and a non-sensing region positioned outside the touch sensing region.

The touch sensor may sense the touch by various methods. For example, the touch sensor may be classified by various types such as a resistive type, a capacitive type, an electro-magnetic (EM) type, and an optical type. While the exemplary embodiment disclosed herein may include the capacitive type touch sensor, this is just illustrative and not a limitation of the inventive concept.

The touch sensor unit 400 includes a plurality of touch electrodes that make up the touch sensor and a plurality of touch wires connected to the touch electrodes to transmit sensing input signals or sensing output signals. The touch sensor unit 400 includes at least one insulating layer or substrate, and the touch electrode and the touch wire may be formed on at least one surface of the insulating layer or the substrate.

The touch sensor unit 400 may also be curved along the touch surface 1A.

In the case of the capacitive type touch sensor according to the exemplary embodiment, each touch electrode may form a self sensing capacitance as a touch sensor. The self sensing capacitor receives the sensing input signal through the touch wire to be charged with a predetermined charge amount, and may output a sensing output signal that is different from the sensing input signal. The input signal is generated in response to a change in the amount of charge in the capacitor caused by conduction through an external object such as a finger and the touch wire.

In the case of the capacitive type touch sensor according to the exemplary embodiment, the plurality of touch electrodes may include a first touch electrode receiving the sensing input signal and a second touch electrode outputting the sensing output signal. The first touch electrode and the second touch electrode that are adjacent to each other may form a mutual sensing capacitor as a touch sensor. The mutual sensing capacitor receives the sensing input signal and outputs a change in charge amount by the touch of the external object as the sensing output signal to sense the touch.

The display device 1 according to the exemplary embodiment may further include a display panel 300 displaying an image. A display area of the display panel 300 includes a plurality of pixels and a plurality of display signal lines such as gate lines and data lines that are connected to the pixels to transfer driving signals.

The plurality of pixels may be arranged substantially in a matrix form, although this is not a limitation. Each pixel may include at least one switching element that is connected with the gate line and the data line and at least one pixel electrode connected thereto. The switching element may be a three-terminal element such as a thin film transistor which is integrated on the display panel 300. The switching element is turned on or off according to the gate signal transferred by the gate line to transfer the data signal transferred by the data line to the pixel electrode. The pixel may further include an opposed electrode facing the pixel electrode. The opposed electrode may transfer a common voltage. The pixel may display an image with desired luminance depending on the data voltage applied to the pixel electrode.

In an organic light emitting panel, a light emitting layer is positioned between the pixel electrode and the opposed electrode to form a light emitting element.

In order to implement a color display, each pixel may display one of the primary colors, and a desired color may be recognized in a combination of the primary colors. As an example of the primary colors, three primary colors of red, green, and blue or four primary colors may be included. Each pixel may further include a color filter positioned at a portion corresponding to each pixel electrode and representing one of the primary colors, and the light emitting layer included in the light emitting element may emit colored light.

Referring to FIGS. 1 and 2, the display panel 300 may include a display element layer 310 in which the thin film transistor, the pixel electrode, the opposed electrode, and other insulating layers are positioned, and an encapsulation layer 320 encapsulating the display element layer 310. The encapsulation layer 320 may include at least one of glass, plastic, an organic layer, or an inorganic layer. The encapsulation layer 320 may have a substrate or film form, and may include at least one inorganic insulating layer and/or organic insulating layer.

The touch sensor unit 400 according to the exemplary embodiment may be included in the display panel 300 or positioned on the upper surface of the display panel 300. In detail, the touch sensor unit 400 may be positioned between the display element layer 310 and the encapsulation layer 320 as illustrated in FIG. 1 (in-cell type), or positioned on the encapsulation layer 320 as illustrated in FIG. 2. When the touch sensor unit 400 is positioned on the encapsulation layer 320, the touch electrode and/or the touch wire of the touch sensor unit 400 may be directly formed on the upper surface of the encapsulation layer 320 (on-cell type), and the touch panel may be attached on the upper surface of the display panel 300 after manufacturing the touch panel by forming the touch electrode and/or the touch wire on a separate substrate (add-on type).

The display panel 300 may also be concavely curved along the touch surface 1A.

The touch electrode of the touch sensor unit 400 may have a predetermined minimum light transmittance level so as to transmit light from the display panel 300. For example, the touch electrode may include at least one of indium tin oxide (ITO), indium zinc oxide (IZO), metal nanowire, a conductive polymer such as PEDOT, a metal mesh such as copper (Cu) or silver (Ag), carbon nano tube (CNT), and a transparent conductive material such as a thin metal layer.

According to the exemplary embodiment, the touch surface 1A may be curved along an x-direction and/or another (second) direction such as a y-direction or a z-direction. In the exemplary embodiment, the touch surface 1A is curved only along a single direction (specifically, the x-direction). However, it should be understood that the exemplary embodiment may be adapted to a case where the touch surface 1A is curved along a different direction.

The touch surface 1A is a physical surface that includes a center region CT, and a first edge region EG1 and a second edge region EG2 which are positioned at both sides of the center region CT.

The center region CT is positioned between a first boundary BD1 and a second boundary BD2 which are boundary lines spaced apart from each other along the x-direction. The first boundary BD1 and the second boundary BD2 may extend substantially in the y-direction as illustrated in FIG. 1 or 2. The first boundary BD1 is positioned between the center of the touch surface 1A and one edge, and the second boundary BD2 is positioned between the center of the touch surface 1A and the other edge. The position of the first boundary BD1 and the second boundary BD2 may be controlled according to a design condition. For example, the first boundary BD1 may be positioned in the middle of one region based on the center of the touch surface 1A, and the second boundary BD2 may be positioned in the middle of the other region based on the center of the touch surface 1A.

Areas of the first edge region EG1 and the second edge region EG2 may be the same as each other or different from each other.

Referring to FIG. 3, a distance between the touch surface 1A and a virtual touch surface 1B, which is a plane connecting both ends of the display device 1, may vary according to the x-direction. Since the touch surface 1A included in the display device 1 according to the exemplary embodiment is curved based on the viewer, a distance H1 between the virtual touch surface 1B and the touch surface 1A at the center region CT may be larger than a distance H2 between the virtual touch surface 1B and the touch surface 1A at the first edge region EG1 and/or the second edge region EG2.

According to the exemplary embodiment, under the same touch condition, touch sensitivity of the touch sensor positioned to correspond to the center region CT of the touch surface 1A among the plurality of touch sensors included in the touch sensor unit 400 is higher than touch sensitivity of the touch sensor positioned to correspond to the first edge region EG1 and/or the second edge region EG2. Here, the same touch condition may mean a case where a distance between the touched external object and the touch surface 1A is constant.

When the user applies a touch, the touch object such as a finger may contact the touch surface 1A. Alternatively, a user familiar with a flat panel display having a touch sensing function or a user performing a rapid touch may use a hovering touch, in which the touch object does not actually contact the touch surface 1A but hovers around the virtual touch surface 1B. In the case of the capacitive type touch sensor, as the distance from the touch surface 1A of the touch object is increased, the size of the sensing output signal is decreased. As a result, the touch may not be sensed at the center region CT where the distance between the virtual touch surface 1B and the touch surface 1A is largest or an error in the touch sensing may occur.

However, according to the exemplary embodiment, the touch sensitivity of the touch sensor positioned in the center region CT of the touch surface 1A is higher than the touch sensitivity of the touch sensor positioned in the first edge region EG1 and/or the second edge region EG2. Hence, when the touch object touches an area along the virtual touch surface 1B, even though the distance between the touch object and the touch surface 1A at the center region CT is relatively far, the same touch output signal as the first edge region EG1 or the second edge region EG2 may be generated. Accordingly, even a "hovering touch" at the center region CT may be accurately sensed, and the touch information processed and generated in the touch driver is generated substantially regardless of the distance between the virtual touch surface 1B and the touch surface 1A to prevent an error of the touch information according to a position.

Next, a detailed structure and a driving method of the display device according to the exemplary embodiment will be described with reference to FIGS. 4 to 8 in addition to the drawings described above.

Figure 4:
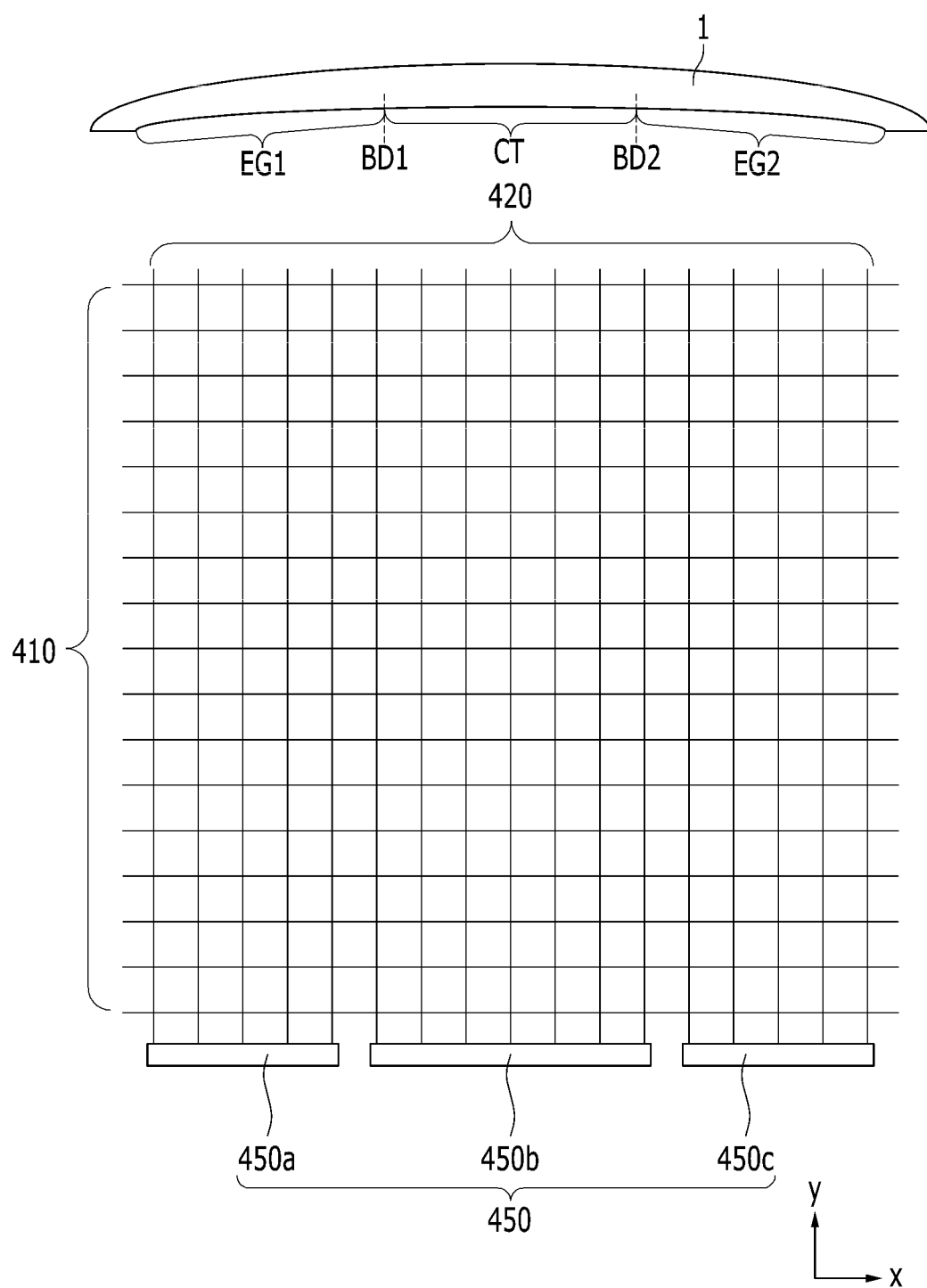
FIG. 4 is a plan view of a touch sensor unit of the curved display device according to the exemplary embodiment of the present inventive concept.

FIG. 4 is a plan view of a touch sensor unit of the curved display device according to the exemplary embodiment, and FIGS. 5 to 8 are plan views of the touch sensor unit of the curved display device according to the exemplary embodiment, respectively.

Referring to FIG. 4, the touch sensor unit 400 of the display device 1 according to the exemplary embodiment includes a plurality of first touch electrodes 410 and a plurality of second touch electrodes 420. The plurality of first touch electrodes 410 is arranged in a y-direction, and each of the first touch electrodes 410 may substantially extend in an x-direction. The plurality of second touch electrodes 420 is arranged in an x-direction, and each of the second touch electrodes 420 may substantially extend in a y-direction. An insulating layer (not illustrated) may be positioned between the first touch electrode 410 and the second touch electrode 420.

The first touch electrode 410 and the second touch electrode 420 are adjacent to each other on a plane or overlap with each other with an insulating layer therebetween. Together, the first touch electrode 410 and the second touch electrode 420 may form a mutual sensing capacitor as a touch sensor.

The first touch electrode 410 and the second touch electrode 420 may be connected with the touch driver 450. The touch driver 450 may be positioned at one side of the touch sensor unit 400, but this is just one possibility and not a limitation of the inventive concept. The first touch electrode 410 may be connected to the touch driver 450 through a plurality of touch wires (not illustrated) connected thereto.

The touch driver 450 may input the sensing input signal to one of the first touch electrode 410 and the second touch electrode 420 and receive the sensing output signal from the other electrode. The touch driver 450 processes the sensing output signal to generate touch information such as existence of the touch and a touch position.

The touch driver 450 may be directly mounted on the touch sensor unit 400 in at least one IC chip form, mounted on a flexible printed circuit film to be attached on the touch sensor unit 400 in a tape carrier package (TCP), or mounted on a separate printed circuit board to be connected with the touch sensor unit 400. The touch driver 450 may also be integrated on the touch sensor unit 400 together with the touch electrode and the touch wire.

Referring to FIG. 4, the touch driver 450 may include a first touch driver 450a connected with the touch sensor of the first edge region EG1, a second touch driver 450b connected with the touch sensor of the center region CT, and a third touch driver 450c connected with the touch sensor of the second edge region EG2. Each of the touch drivers 450a, 450b, and 450c may be included in one chip. Unlike this, the touch driver 450 formed by one chip is connected with all the touch sensors to drive the touch sensors.

According to the exemplary embodiment, the sensing input signal input to the touch sensor positioned to correspond to the center region CT may have a larger voltage than the sensing input signal input to the touch sensor positioned to correspond to the first edge region EG1 and/or the second edge region EG2. Accordingly, high sensitivity is achieved for the touch sensor positioned at the center region CT where the distance between the virtual touch surface 1B and the touch surface 1A is large. Accordingly, the hovering touch at the center region CT may be sensed with a touch sensitivity equivalent to that at the first edge region EG1 and/or the second edge region EG2. Furthermore, even at the center region CT, in the hovering touch mode, the hover may be accurately sensed. Further, the touch information processed and generated in the touch driver 450 may be generated regardless of the distance between the virtual touch surface 1B and the touch surface 1A to prevent an error of the touch information according to a position. In this case, the density of the second touch electrode 420 positioned to correspond to the center region CT may be substantially the same as the density of the second touch electrode 420 positioned to correspond to the first edge region EG1 and/or the second edge region EG2.

However, in the direct touch mode in which the touch object is closely adjacent to or contacts the touch surface 1A, in the touch driver 450, voltage magnitudes of the sensing input signal input to the touch sensor of the center region CT and the sensing input signal input to the touch sensor of the first edge region EG1 and/or the second edge region EG2 may be equivalent to each other.

Figure 5:
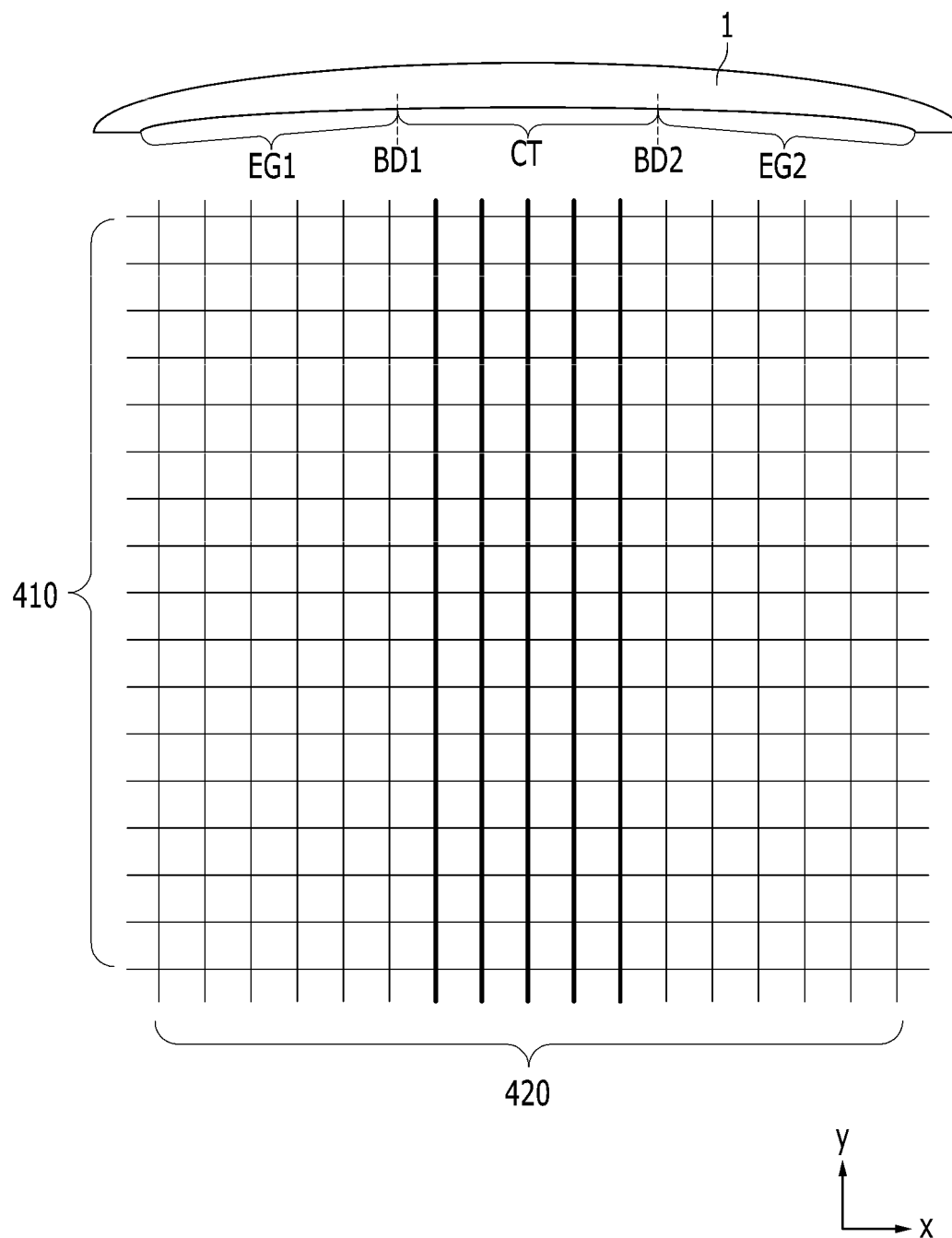
FIGS. 5, 6, 7, 8, 9, 10, 11, 12, 13, 14, 15, 16, 17, 18, 19, and 20 are plan views of the touch sensor unit of the curved display device according to the exemplary embodiment of the present inventive concept, respectively.

Referring to FIG. 5, the display device 1 according to the exemplary embodiment is similar to the display device 1 illustrated in FIG. 4. In the embodiment of FIG. 4, a width or an area of the second touch electrode 420 in the center region CT is the same as a width or an area of the second touch electrode 420 in the first edge region EG1 and/or the second edge region EG2.

In the case of FIG. 5, the width or the area of the second touch electrode 420 in the center region CT may be different from (e.g., larger than) the width or the area of the second touch electrode 420 corresponding to the first edge region EG1 and/or the second edge region EG2. Accordingly, since an overlapping area or a length of a facing portion of the first touch electrode 410 and the second touch electrode 420 that overlap with each other or are adjacent to each other at the center region CT is larger than that of the first touch electrode 410 and the second touch electrode 420 at the first edge region EG1 and/or the second edge region EG2, the touch sensitivity of the touch sensor in the center region CT may be relatively increased.

A pitch of, or the space between, the plurality of second touch electrodes 420 at the center region CT may be substantially the same as a pitch of the plurality of second touch electrodes 420 at the first edge region EG1 and/or the second edge region EG2. As a result, an area ratio occupied by the plurality of touch electrodes 420 included in the plurality of touch sensors positioned to correspond to the center region CT per unit area may be different from an area ratio occupied by the plurality of touch electrodes 420 included in the plurality of touch sensors positioned to correspond to the first edge region EG1 and/or the second edge region EG2 per unit area. In detail, an area ratio occupied by the plurality of touch electrodes 420 positioned at the center region CT per unit area may be larger than an area ratio occupied by the plurality of second touch electrodes 420 positioned at the first edge region EG1 and/or the second edge region EG2 per unit area.

Figure 6:
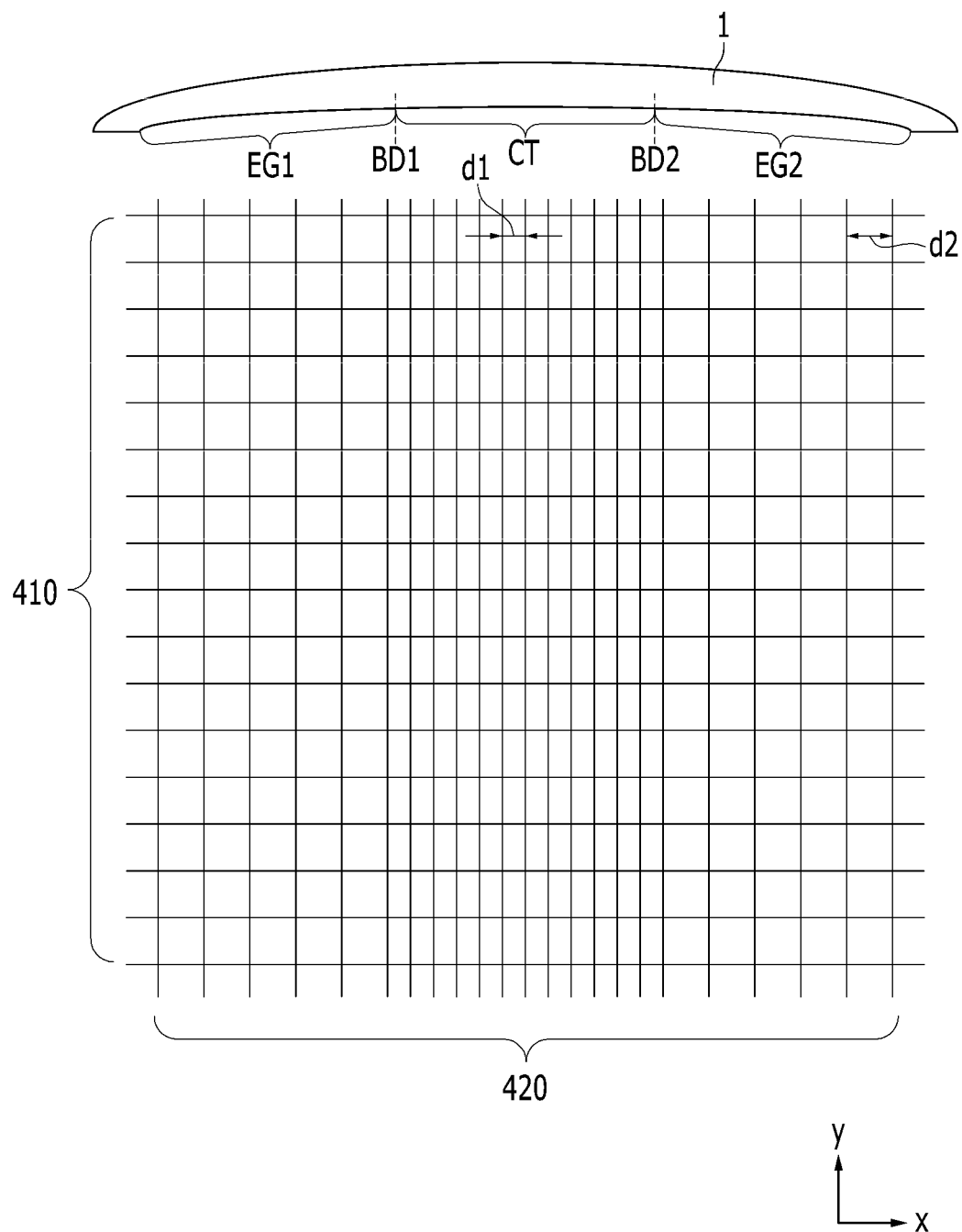

According to another exemplary embodiment of FIG. 6, the width or the area of the second touch electrode 420 corresponding to the center region CT may be smaller than the width or the area of the second touch electrode 420 in the first edge region EG1 and/or the second edge region EG2. Further, the distance between adjacent second touch electrodes 420 at the center region CT may be smaller than the distance between adjacent second touch electrodes 420 at the first edge region EG1 and/or the second edge region EG2. As a result, the area ratio occupied by the plurality of second touch electrodes 420 positioned at the center region CT per unit area may be larger than the area ratio occupied by the plurality of second touch electrodes 420 positioned at the first edge region EG1 and/or the second edge region EG2 per unit area.

Accordingly, the touch sensitivity of the touch sensor at the center region CT may be relatively higher.

According to the exemplary embodiment, one first touch electrode 410 may have a different width or area depending on its position. That is, the width or the area at the center region CT of the first touch electrode 410 may be larger than the width or the area at the first edge region EG1 and/or the second edge region EG2. Accordingly, since an overlapping area or a length of a facing portion of the first touch electrode 410 and the second touch electrode 420 that overlap with each other or are adjacent to each other at the center region CT may be larger than that of the first touch electrode 410 and the second touch electrode 420 at the first edge region EG1 and/or the second edge region EG2, the touch sensitivity of the touch sensor of the center region CT may be relatively higher.

The widths or the areas of the plurality of second touch electrode 420 positioned at the center region CT may be constant. However, in some embodiments, the width or the area of the second touch electrode 420 is largest at the center of the center region CT and may gradually decrease with distance from the center along the x-direction. Similarly, the width or the area of the plurality of second touch electrodes 420 may be constant even at the first edge region EG1 and/or the second edge region EG2. Alternatively, (the center region CT may be constant s), the width or the area of the second touch electrode 420 is largest at a portion adjacent to the center region CT and may gradually decrease with distance from the center along the x-direction.

Referring to FIG. 6, the display device 1 according to the exemplary embodiment is almost the same as the display device 1 according to the exemplary embodiment illustrated in FIG. 4 described above, but a distance d1 between the second touch electrodes 420 which are positioned at the center region CT and adjacent to each other may be different from a distance d2 between the second touch electrodes 420 positioned at the first edge region EG1 and/or the second edge region EG2 and adjacent to each other.

According to the exemplary embodiment of FIG. 6, the distance d1 between the second touch electrodes 420 which are adjacent to each other at the center region CT may be smaller than the distance d2 between the second touch electrodes 420 which are adjacent to each other at the first edge region EG1 and/or the second edge region EG2. Accordingly, since an overlapping area or a length of a facing portion of the first touch electrode 410 and the second touch electrode 420 that overlap with each other or are adjacent to each other at the center region CT is larger than that of the first touch electrode 410 and the second touch electrode 420 at the first edge region EG1 and/or the second edge region EG2, the touch sensitivity of the touch sensor of the center region CT may be higher. Further, since the area ratio occupied by the plurality of second touch electrodes 420 positioned at the center region CT per unit area is larger than the area ratio occupied by the plurality of second touch electrodes 420 positioned at the first edge region EG1 and/or the second edge region EG2 per unit area, the touch sensitivity of the touch sensor of the center region CT may be relatively higher.

The distance d1 between the adjacent second touch electrodes 420 positioned at the center region CT may be constant. However, in some embodiments, the distance d1 is smallest at the center of the center region CT and may gradually increase moving toward the side edges. Similarly, the distance d2 between the adjacent second touch electrodes 420 may be constant at the first edge region EG1 and/or the second edge region EG2, or the distance d2 between the adjacent second touch electrodes 420 is smallest at a portion closest to the center region CT and may gradually increase with distance from the center region CT.

Figure 7:
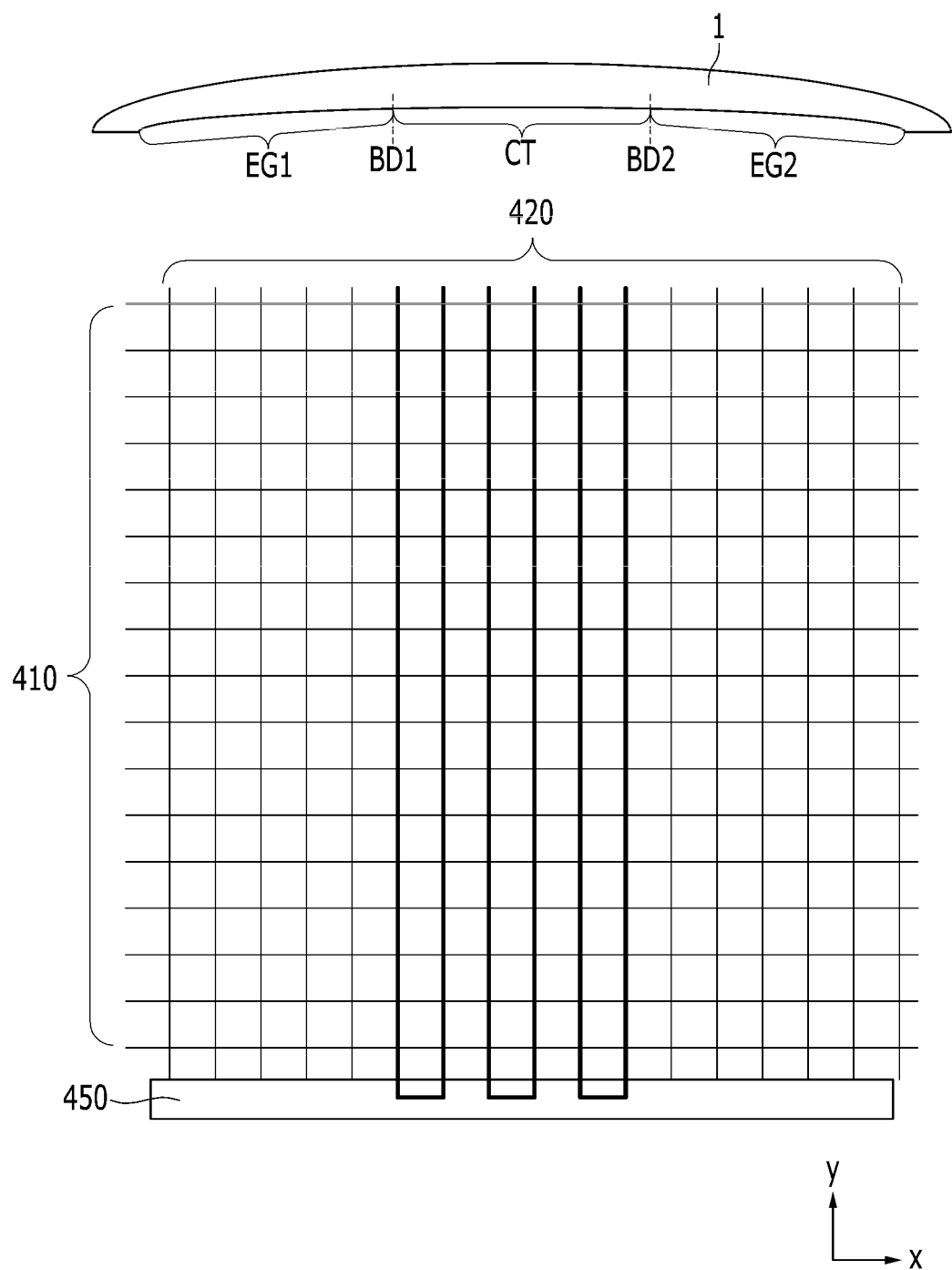

Referring to FIG. 7, the display device 1 according to the exemplary embodiment is similar to the display device 1 according to the exemplary embodiment illustrated in FIG. 5 described above. However, in the direct touch mode, the touch driver 450 couples touch wires connected to at least two electrodes of the plurality of second touch electrodes 420 positioned at the center region CT to apply the touch input signals simultaneously.

As described above, when the user touches the display device including a structure for standardizing the touch sensitivity in the hovering touch mode and in the direct touch mode, the touch sensitivity at the center region CT is higher than that at the first edge region EG1 and/or the second edge region EG2. As a result, the touch sensitivity of the entirety of the touch surface 1A may not be uniform. However, according to the exemplary embodiment, since at least two touch sensors positioned at the center region CT are coupled and the touch input signals are simultaneously applied to the touch sensors to drive the touch sensors, the touch sensitivity of the entirety of the touch surface 1A may be uniformly readjusted.

Figure 8:
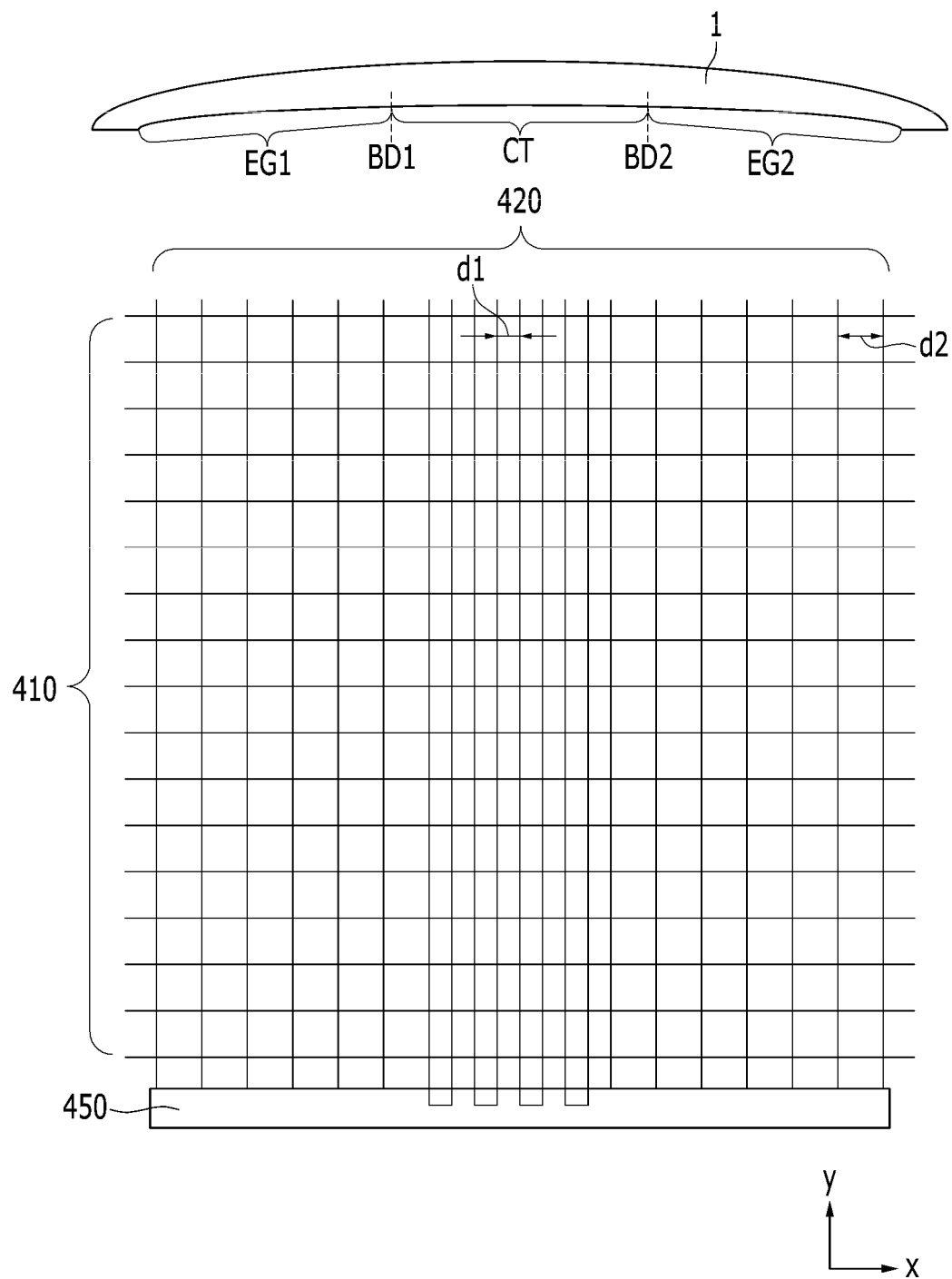

Referring to FIG. 8, the display device 1 according to the exemplary embodiment is almost the same as the display device 1 according to the exemplary embodiment illustrated in FIG. 6 described above, but in the direct touch mode in which the touch object is closely adjacent to or directly touches the touch surface 1A, the touch driver 450 couples touch wires connected to at least two electrodes of the plurality of second touch electrodes 420 positioned at the center region CT to apply the touch input signal simultaneously. The resulting effect is similar to that in the description of the exemplary embodiment illustrated in FIG. 7.

Hereinafter, a detailed structure and a driving method of the display device according to the exemplary embodiment will be described with reference to each of FIGS. 9 to 13 together with FIGS. 1 to 3 described above.

FIGS. 9 to 13 are plan views of the touch sensor unit of the curved display device according to the exemplary embodiment, respectively.

Figure 9:
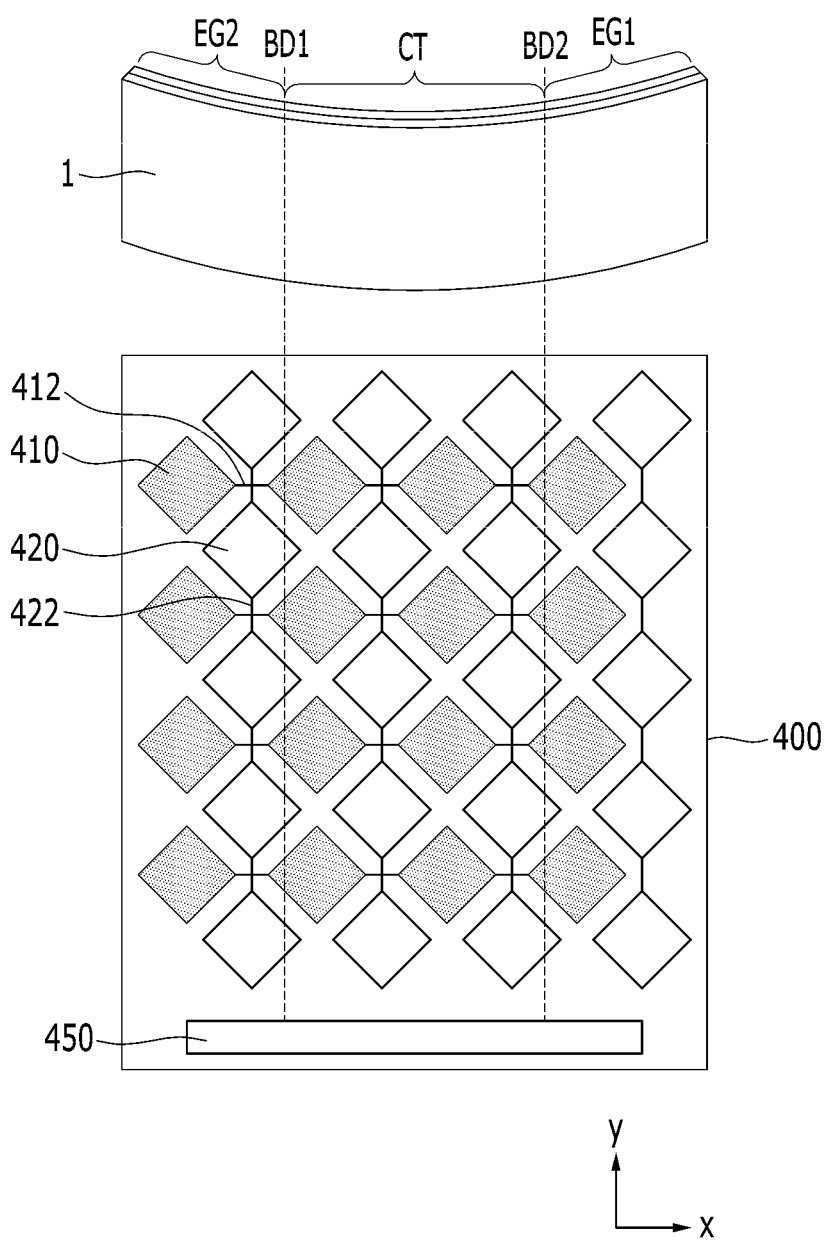

Referring to FIG. 9, the display device 1 according to the exemplary embodiment is almost the same as the display device illustrated in FIGS. 1 to 4, but a structure of the touch electrode may be different. The description below will focus on the differences from the above exemplary embodiment.

The touch sensor unit 400 includes a plurality of first touch electrodes 410 and a plurality of second touch electrodes 420. The plurality of first touch electrodes 410 and the plurality of second touch electrodes 420 may be alternately distributed and disposed. The plurality of first touch electrodes 410 are disposed in each of a column direction and a row direction and the plurality of second touch electrodes 420 may be disposed in each of a column direction and a row direction.

The first touch electrode 410 and the second touch electrode 420 may be positioned on the same layer and positioned on different layers with an insulating layer therebetween.

Each of the first touch electrode 410 and the second touch electrode 420 may have a quadrangular shape, but is not limited thereto and may have various shapes including protrusions in order to improve the sensitivity of the touch sensor.

The plurality of first touch electrodes 410 positioned in each row may be connected to each other through a first connecting portion 412, and the plurality of second touch electrodes 420 positioned in each column may be connected to each other through a second connecting portion 422. An insulating layer (not illustrated) is positioned between the first connecting portion 412 and the second connecting portion 422 to insulate the first connecting portion 412 and the second connecting portion 422 from each other.

Although not illustrated in FIG. 9, the first touch electrodes 410 in each row are connected with the touch driver 450 through a first touch wire, and the second touch electrodes 420 in each column may be connected with the touch driver 450 through a second touch wire. The first touch wire and the second touch wire may be positioned in the non-sensing region and may also be positioned in the touch sensing region.

The first touch electrode 410 and the second touch electrode 420 which are adjacent to each other may form a mutual sensing capacitor functioning as the touch sensor. The mutual sensing capacitor may receive the sensing input signal through one of the first touch electrode 410 and the second touch electrode 420 and output a change in charge amount by the touch of the external object as the sensing output signal through the remaining touch electrodes 410 and 420.

According to the exemplary embodiment, the sensing input signal received by the touch sensor positioned at the center region CT may have a larger voltage than the sensing input signal received by the touch sensor at the first edge region EG1 and/or the second edge region EG2. Accordingly, the touch sensitivity of the touch sensor positioned at the center region CT where the distance between the virtual touch surface 1B and the physical touch surface 1A is relatively large is high. Also, the hovering touch at the center region CT may be sensed with the touch sensitivity equivalent to the touch at the first edge region EG1 and/or the second edge region EG2, and even at the center region CT, in the hovering touch mode, the touch may be accurately sensed. Further, the touch information processed and generated in the touch driver 450 may be generated regardless of the distance between the virtual touch surface 1B and the touch surface 1A to prevent an error of the touch information according to position. In this case, the density of the first and second touch electrodes 410 and 420 positioned to correspond to the center region CT may be substantially the same as the density of the first and second touch electrodes 410 and 420 positioned to correspond to the first edge region EG1 and/or the second edge region EG2.

However, in the direct touch mode, in the touch driver 450, voltage magnitudes of the sensing input signal input to the touch sensor of the center region CT and the sensing input signal input to the touch sensor of the first edge region EG1 and/or the second edge region EG2 may be equivalent to each other.

Since the description of the touch driver 450 is the same as that of the exemplary embodiment illustrated in FIG. 4 described above, herein, the detailed description is omitted.

Figure 10:
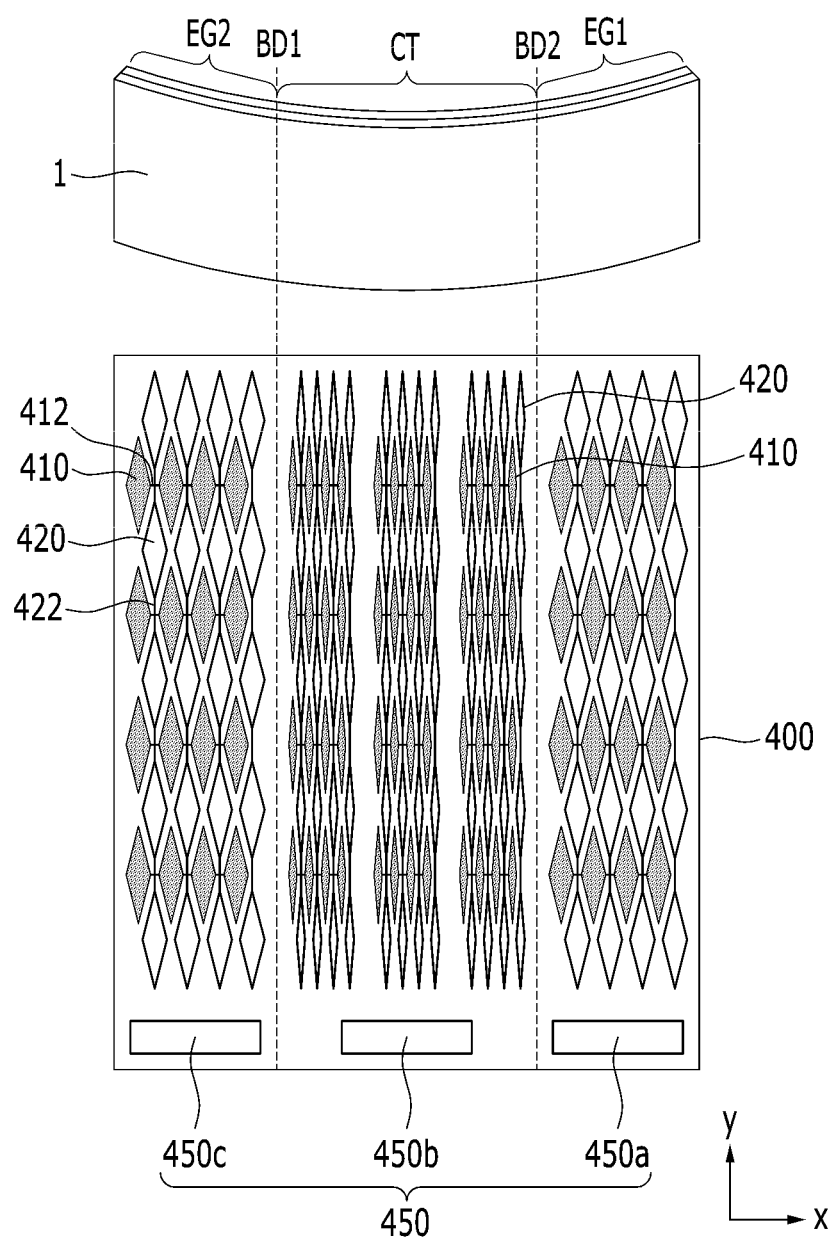

Referring to FIG. 10, the display device 1 according to the exemplary embodiment of the present invention is almost the same as the display device 1 according to the exemplary embodiment illustrated in FIG. 9 described above, but an area of the second touch electrode 420 corresponding to the center region CT may be different from an area of the second touch electrode 420 corresponding to the first edge region EG1 and/or the second edge region EG2.

According to the exemplary embodiment, the area of the first touch electrode 410 and the second touch electrode 420 corresponding to the center region CT may be smaller than the area of the first touch electrode 410 and the second touch electrode 420 corresponding to the first edge region EG1 and/or the second edge region EG2. Further, an area ratio occupied by the first touch electrode 410 and the second touch electrode 420 included in the plurality of touch sensors positioned to correspond to the center region CT per unit area may be larger than an area ratio per unit area occupied by the first touch electrode 410 and the second touch electrode 420 included in the plurality of touch sensors positioned to correspond to the first edge region EG1 and/or the second edge region EG2 per unit area. Accordingly, since a length per unit area of a facing portion of the first touch electrode 410 and the second touch electrode 420 which are adjacent to each other at the center region CT is larger than that of the first touch electrode 410 and the second touch electrode 420 at the first edge region EG1 and/or the second edge region EG2, the touch sensitivity of the touch sensor of the center region CT may be relatively higher.

According to the exemplary embodiment, the touch driver 450 may include a first touch driver 450a connected with the touch sensor of the first edge region EG1, a second touch driver 450b connected with the touch sensor of the center region CT, and a third touch driver 450c connected with the touch sensor of the second edge region EG2. Each of the touch drivers 450a, 450b, and 450c may be formed in one chip. In another embodiment, the touch driver 450 on one chip is connected with all the touch sensors to drive the touch sensors.

The areas of the first touch electrode 410 and the second touch electrode 420 positioned at the center region CT may be constant. However, in some cases, the areas of the first touch electrode 410 and the second touch electrode 420 are largest at the center of the center region CT and may gradually decrease with distance from the center along the x-direction. Similarly, the areas of the first touch electrode 410 and the second touch electrode 420 may be constant even in the first edge region EG1 and/or the second edge region EG2. Alternatively, the areas of the first touch electrode 410 and the second touch electrode 420 are largest at a portion adjacent to the center region CT and may gradually decrease with distance from the center along the x-direction.

Figure 11:
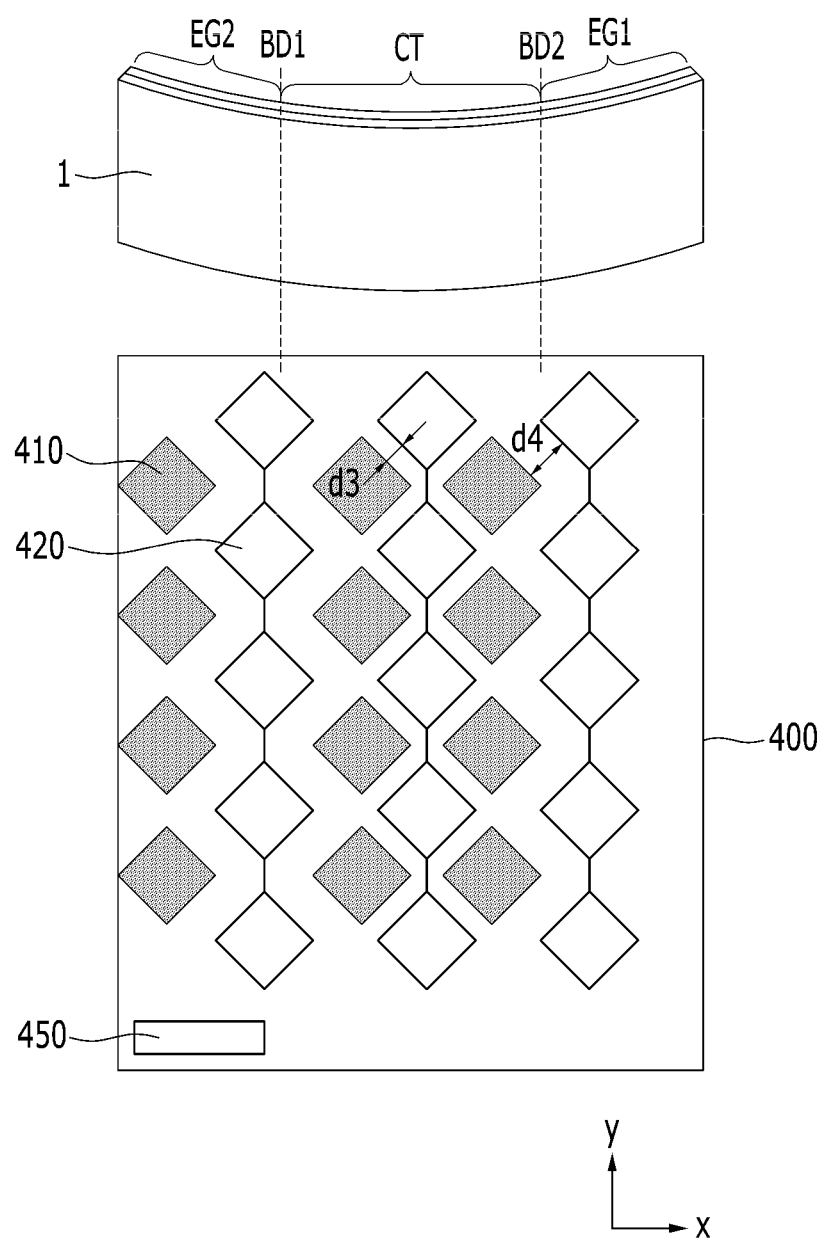

Referring to FIG. 11, the display device 1 according to the exemplary embodiment is almost the same as the display device 1 according to the exemplary embodiment illustrated in FIG. 9 described above, but a distance d3 between the first touch electrode 410 and the second touch electrode 420 which are positioned at the center region CT and adjacent to each other may be different from a distance d4 between the first touch electrode 410 and the second touch electrode 420 which are positioned at the first edge region EG1 and/or the second edge region EG2 and adjacent to each other.

According to the exemplary embodiment, the distance d3 between the first touch electrode 410 and the second touch electrode 420 which are adjacent to each other at the center region CT may be smaller than the distance d4 between the first touch electrode 410 and the second touch electrode 420 which are adjacent to each other at the first edge region EG1 and/or the second edge region EG2. Since a capacitance of the mutual sensing capacitor formed by the first touch electrode 410 and the second touch electrode 420 that are adjacent to each other at the center region CT is larger than the capacitance formed by the first touch electrode 410 and the second touch electrode 420 at the first edge region EG1 and/or the second edge region EG2, the touch sensitivity of the touch sensor of the center region CT may be relatively higher. Further, since the area ratio occupied by the first touch electrode 410 and the second touch electrode 420 positioned at the center region CT per unit area is larger than an area ratio occupied by the first touch electrode 410 and the second touch electrode 420 positioned at the first edge region EG1 and/or the second edge region EG2 per unit area, the touch sensitivity of the touch sensor of the center region CT may be relatively higher.

The distance d3 between the first touch electrode 410 and the second touch electrode 420 that are adjacent to each other at the center region CT may be constant. However, the distance d3 is smallest at the center of the center region CT and may gradually increase moving toward the sides, along the x-direction away from the center CT. Similarly, the distance d4 between the first touch electrode 410 and the second touch electrode 420 that are adjacent to each other may be constant even in the first edge region EG1 and/or the second edge region EG2. In some cases, the distance d4 between the first touch electrode 410 and the second touch electrode 420 that are adjacent to each other is smallest at a portion adjacent to the center region CT and may gradually increase with distance from the center along the x-direction.

Figure 12:
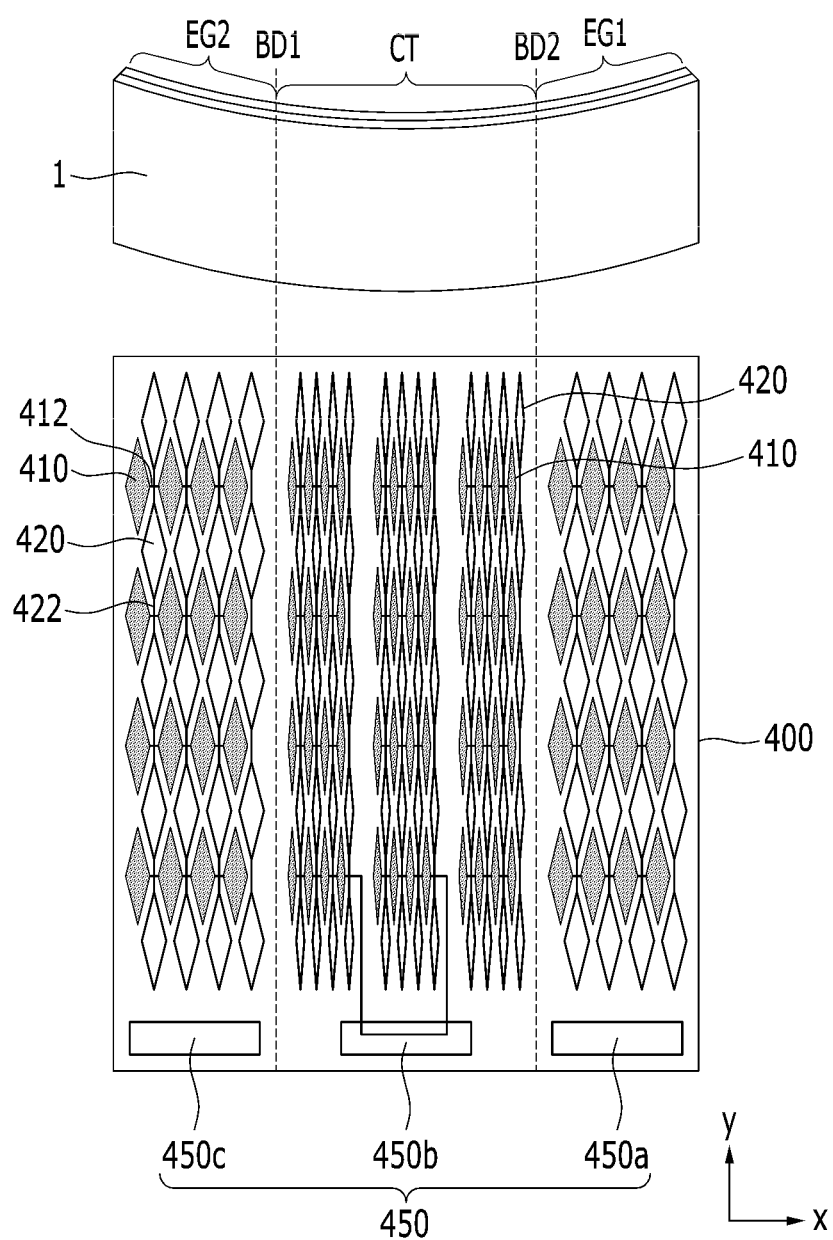

Referring to FIG. 12, the display device 1 according to the exemplary embodiment is almost the same as the display device 1 according to the exemplary embodiment illustrated in FIG. 10 described above, but in the direct touch mode, the touch driver 450 couples touch wires connected to at least two electrodes of the plurality of second touch electrodes 420 or at least two electrodes of the plurality of first touch electrodes 410 positioned at the center region CT to apply the touch input signals simultaneously. Since the resulting effect is the same as that of the exemplary embodiment illustrated in FIG. 6 described above, the detailed description is omitted.

Figure 13:
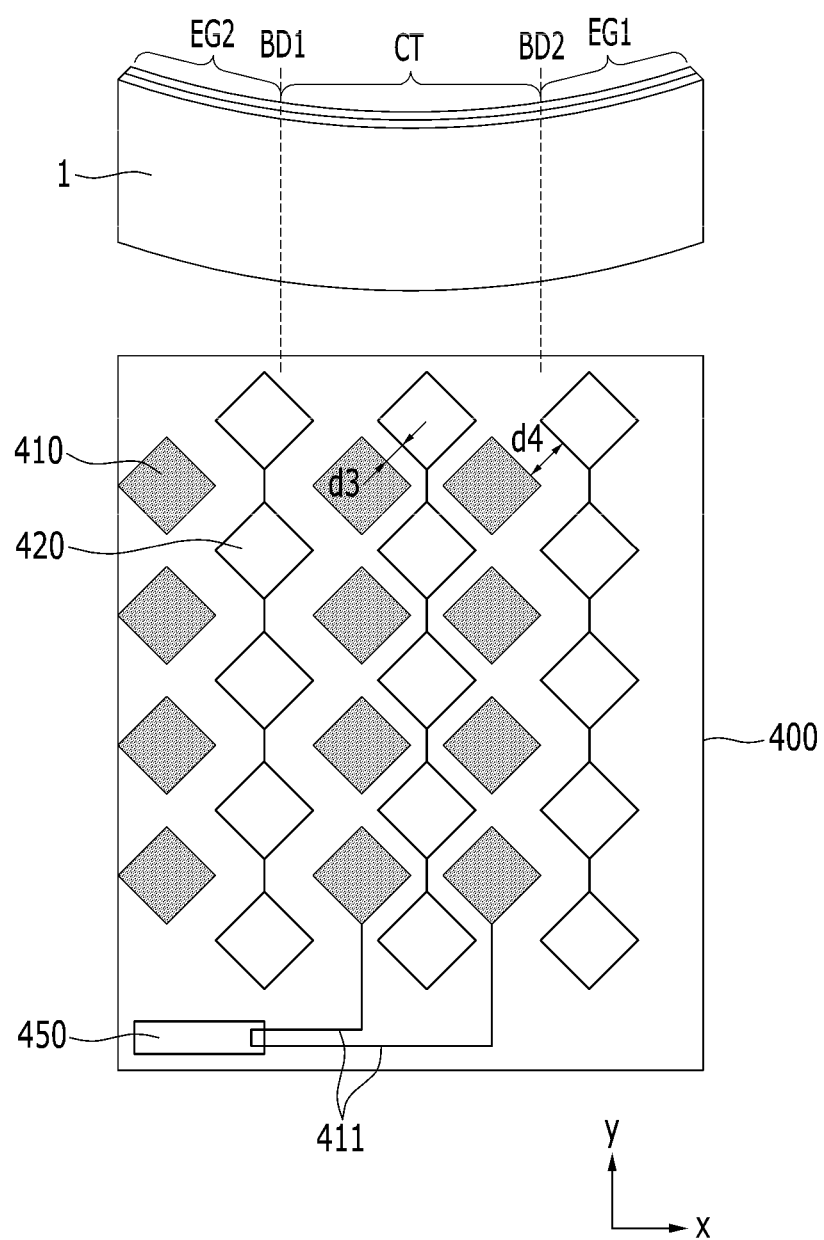

Referring to FIG. 13, the display device 1 according to the exemplary embodiment is almost the same as the display device 1 according to the exemplary embodiment illustrated in FIG. 11 described above, but in the direct touch mode, the touch driver 450 couples touch wires 411 connected to at least two electrodes of the plurality of second touch electrodes 420 or at least two electrodes of the plurality of first touch electrodes 410 positioned at the center region CT to apply the touch input signals simultaneously. The resulting effect is the same as that in the description of the exemplary embodiment illustrated in FIG. 12.

Hereinafter, a detailed structure and a driving method of the display device according to the exemplary embodiment will be described with reference to each of FIGS. 14 to 21 together with FIGS. 1 to 3 described above.

FIGS. 14 to 21 are plan views of the touch sensor unit of the curved display device according to the exemplary embodiment. FIG. 22 is a cross-sectional view of the touch sensor unit of the curved display device according to the exemplary embodiment.

Figure 14:
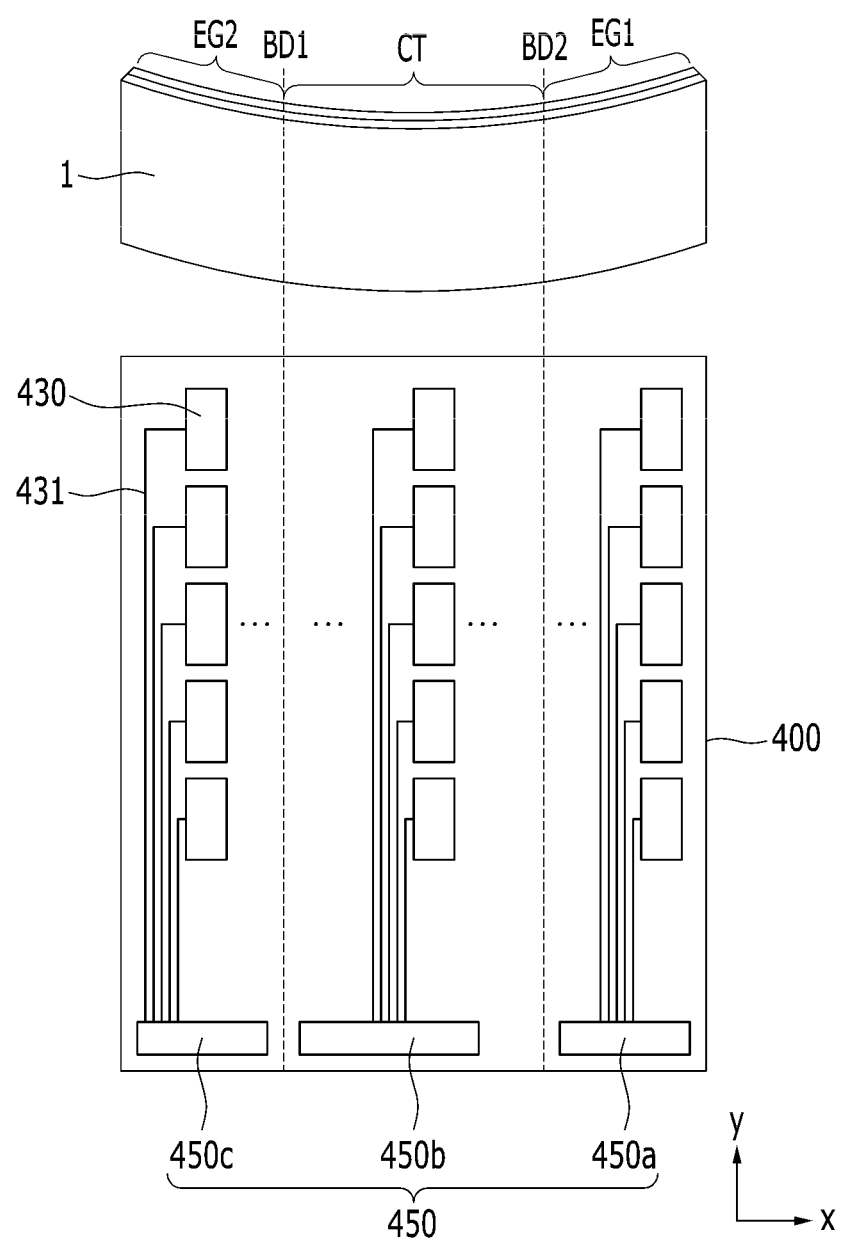
Figure 15:
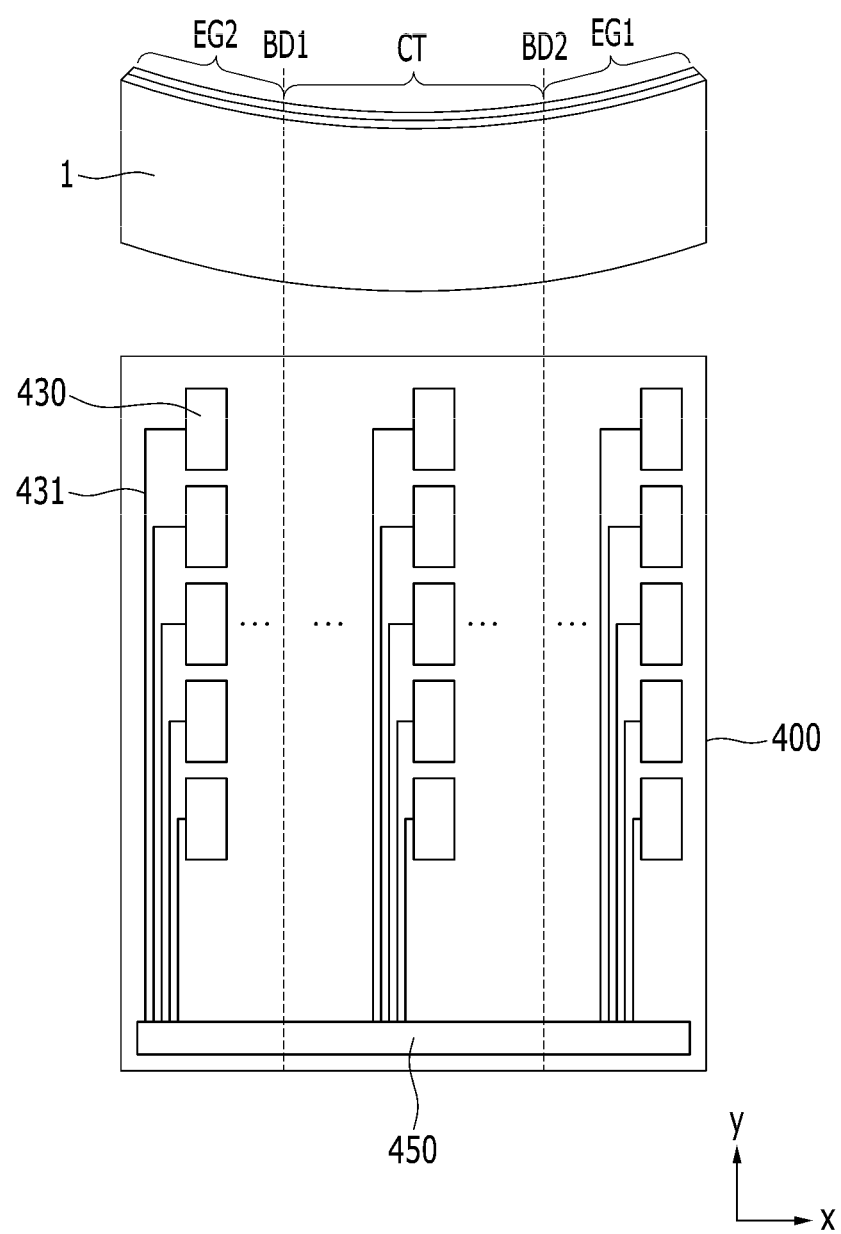

First, referring to FIGS. 14 and 15, the touch sensor including the display device 1 according to the exemplary embodiment includes a plurality of touch electrode 430 and a plurality of touch wires 431 connected thereto.

The plurality of touch electrodes 430 may be arranged in a matrix and formed on the same layer in terms of a cross-sectional structure. The touch electrodes 430 may have a quadrangular shape as illustrated in the figure or a shape different therefrom.

The touch electrode 430 is connected with a touch driver 450 through the touch wire 431 to receive a sensing input signal and generates a sensing output signal depending on the touch to transmit the generated sensing output signal to the touch driver 450. Each touch electrode 430 as a touch sensor forms a self sensing capacitor and may be charged with a predetermined charge amount after receiving the sensing input signal. When external objects, such as fingers, touch the touch sensor, the amount of charge in the self sensing capacitor is changed. As a result, the sensing output signal that is different from the received sensing input signal is output to sense the touch.

Referring to FIG. 14, the touch driver 450 may include a first touch driver 450b connected with a touch sensor of a first edge region EG1, a second touch driver 450b connected with a touch sensor of a center region CT, and a third touch driver 450c connected with a touch sensor of a second edge region EG2. Each touch driver 450a, 450b, or 450c may be formed in one chip. In other embodiments, as illustrated in FIG. 15, the touch driver 450 constituted by one chip is connected with the entire touch sensor to drive the touch sensor.

According to the exemplary embodiment, in the touch driver 450, the sensing input signal input into the touch sensor positioned to correspond to the center region CT may have higher voltage than the sensing input signal input into the touch sensor positioned to correspond to the first edge region EG1 and/or the second edge region EG2. Therefore, touch sensitivity of the touch sensor positioned at the center region CT (where a distance between a virtual touch surface 1B and a virtual touch surface 1A is relatively long) is relatively high. As a result, a hovering touch at the center region CT may be sensed with touch sensitivity equivalent to a touch at the first edge region EG1 and/or the second edge region EG2 and the touch may be normally sensed at the center region CT in the hovering touch mode. Further, touch information processed and generated in the touch driver 450 may be generated substantially regardless of the distance between the virtual touch surface 1B and the physical virtual touch surface 1A to prevent an error of the touch information depending on a position. In this case, the density of the touch electrode 430 positioned at the center region CT may be substantially the same as the density of the touch electrode 430 positioned at the first edge region EG1 and/or the second edge region EG2.

However, in the direct touch mode, a voltage magnitude of the sensing input signal which the touch driver 450 inputs into the touch sensor of the center region CT and a voltage magnitude of the sensing input signal which the touch driver 450 inputs into the first edge region EG1 and/or the second edge region EG2 may be equivalent to each other.

Figure 16:
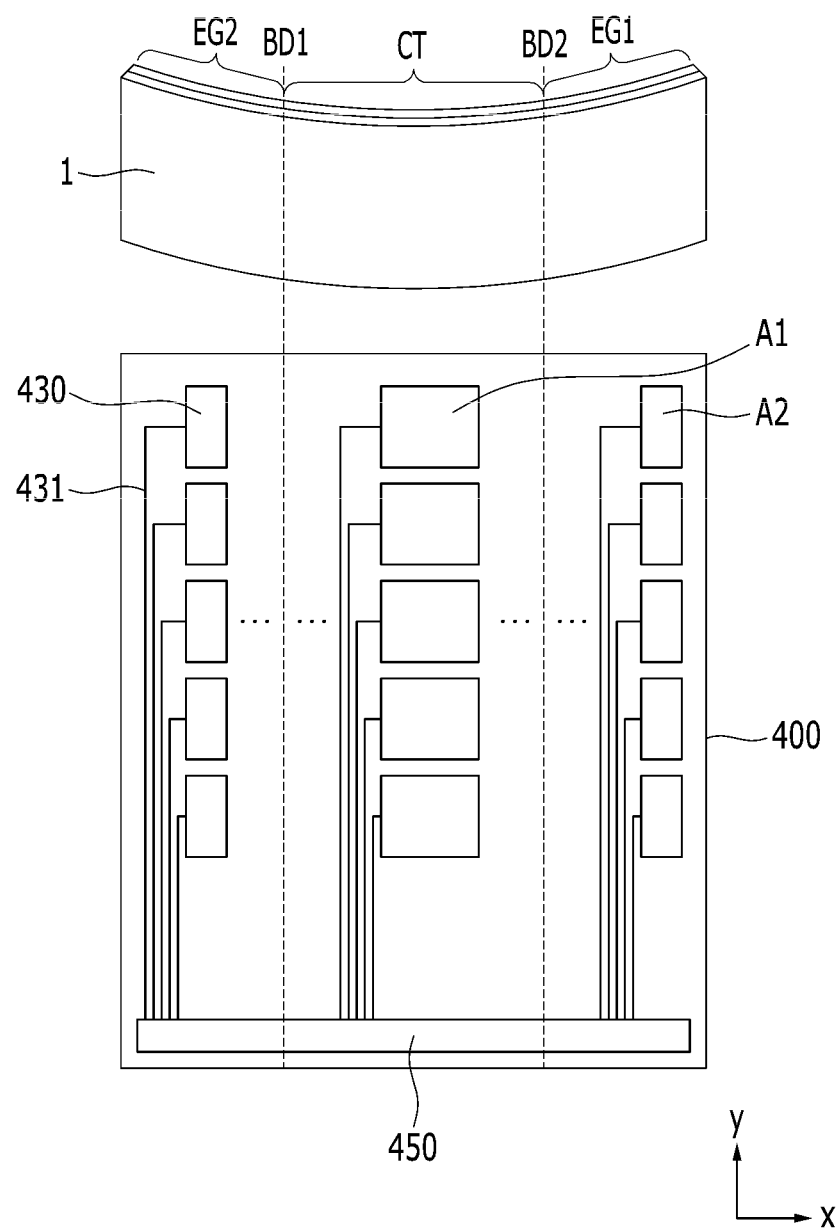

Referring to FIG. 16, the display device 1 according to the exemplary embodiment is similar to the display device 1 according to the exemplary embodiment illustrated in FIG. 14 or 15 described above. However, an area A1 of the touch electrode 430 corresponding to the center region CT may be different from an area A2 of the touch electrode 430 corresponding to the first edge region EG1 and/or the second edge region EG2.

In more detail, the area A1 of the touch electrode 430 corresponding to the center region CT may be larger than the area A2 of the touch electrode 430 positioned corresponding to the first edge region EG1 and/or the second edge region EG2. As a result, since the capacity of the self sensing capacitor formed by the touch electrode 430 at the center region CT is larger than that at the first edge EG1 and/or the second edge EG2, the change amount of the capacity of the self sensing capacitor by the touch by the external object at the center region CT is also larger than that at the first edge region EG1 and/or the second edge region EG2. Accordingly, in the case of the display device 1 that processes a change amount of a capacity of the self sensing capacitor, the touch sensitivity of the touch sensor of the center region CT may be relatively higher.

The area A1 of the touch electrode 430 positioned at the center CT may be constant. However, in some embodiments, the area A1 of the touch electrode 430 is largest at the center of the center region CT and may gradually decrease with distance from the center along the x-direction. Similarly, the area A2 of the touch electrode 430 may be constant even at the first edge region EG1 and/or the second edge region EG2 and unlike this, the area A2 of the touch electrode 430 is largest at a portion adjacent to the center region CT and may gradually decrease with distance from the center region CT along the x-direction.

Figure 17:
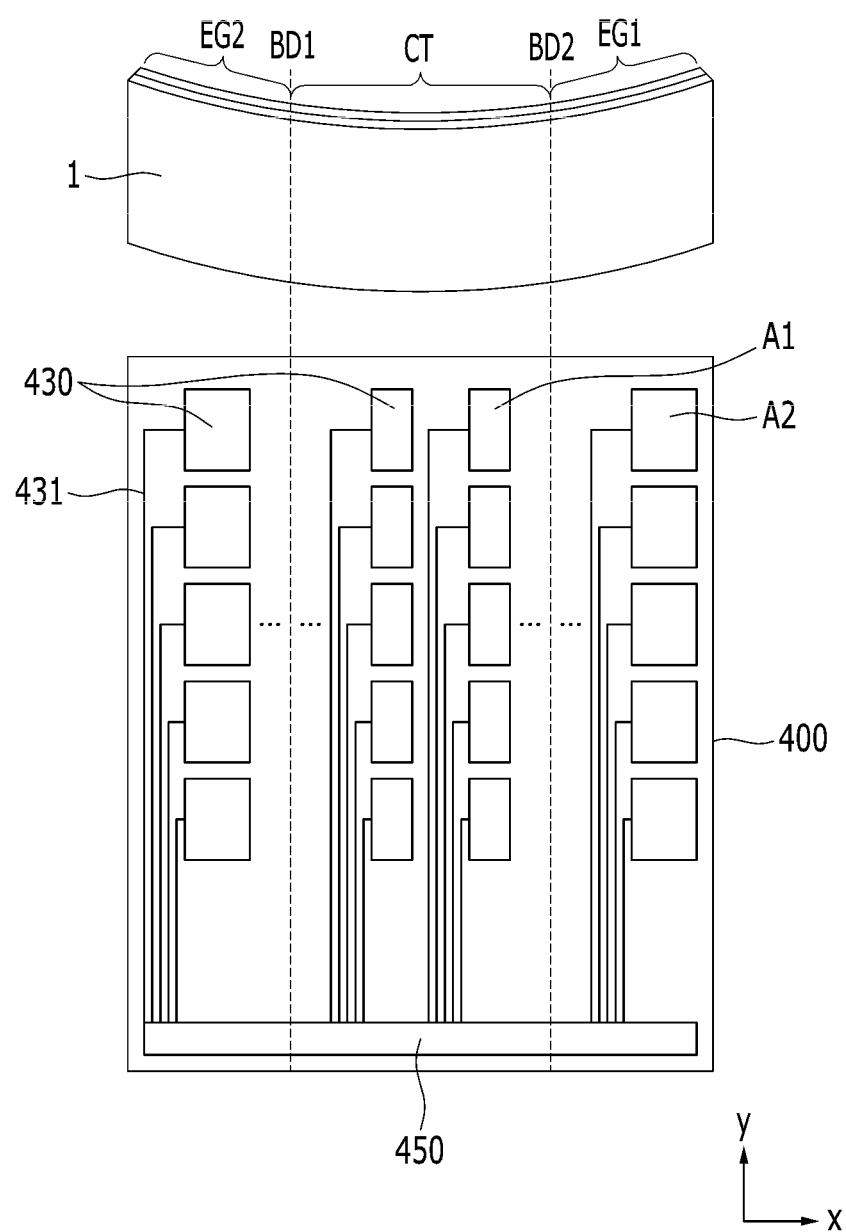

Referring to FIG. 17, the display device 1 according to the exemplary embodiment is almost the same as the display device 1 according to the exemplary embodiment illustrated in FIG. 14 or 15 described above. However, the area A1 of the touch electrode 430 corresponding to the center region CT may be smaller than the area A2 of the touch electrode 430 corresponding to the first edge region EG1 and/or the second edge region EG2. As a result, the capacity of the self-sensing capacitor formed by the touch electrode 430 at the center region CT is smaller than that at the first edge region EG1 and/or the second edge region EG2, but a ratio of the change amount of the capacity of the self sensing capacitor depending on the touch in a total capacity may be higher than that at the first edge region EG1 and/or the second edge region EG2. Accordingly, in the case of the display device 1 that processes the ratio of the change amount of the capacity of the self sensing capacitor in a total capacity as the sensing output signal, the touch sensitivity of the touch sensor of the center region CT may be relatively higher.

According to the exemplary embodiment, a pitch of each of the plurality of touch electrodes 430 at the center region CT may be smaller than that of each of the plurality of touch electrodes 430 at the first edge region EG1 and/or the second edge region EG2. As a result, an area ratio occupied by the plurality of touch electrodes 430 positioned at the center region CT per unit area may be larger than an area ratio occupied by the plurality of touch electrodes 430 positioned at the first edge region EG1 and/or the second edge region EG2 per unit area. Accordingly, the touch sensitivity of the touch sensor at the center region CT may be relatively higher.

Figure 18:
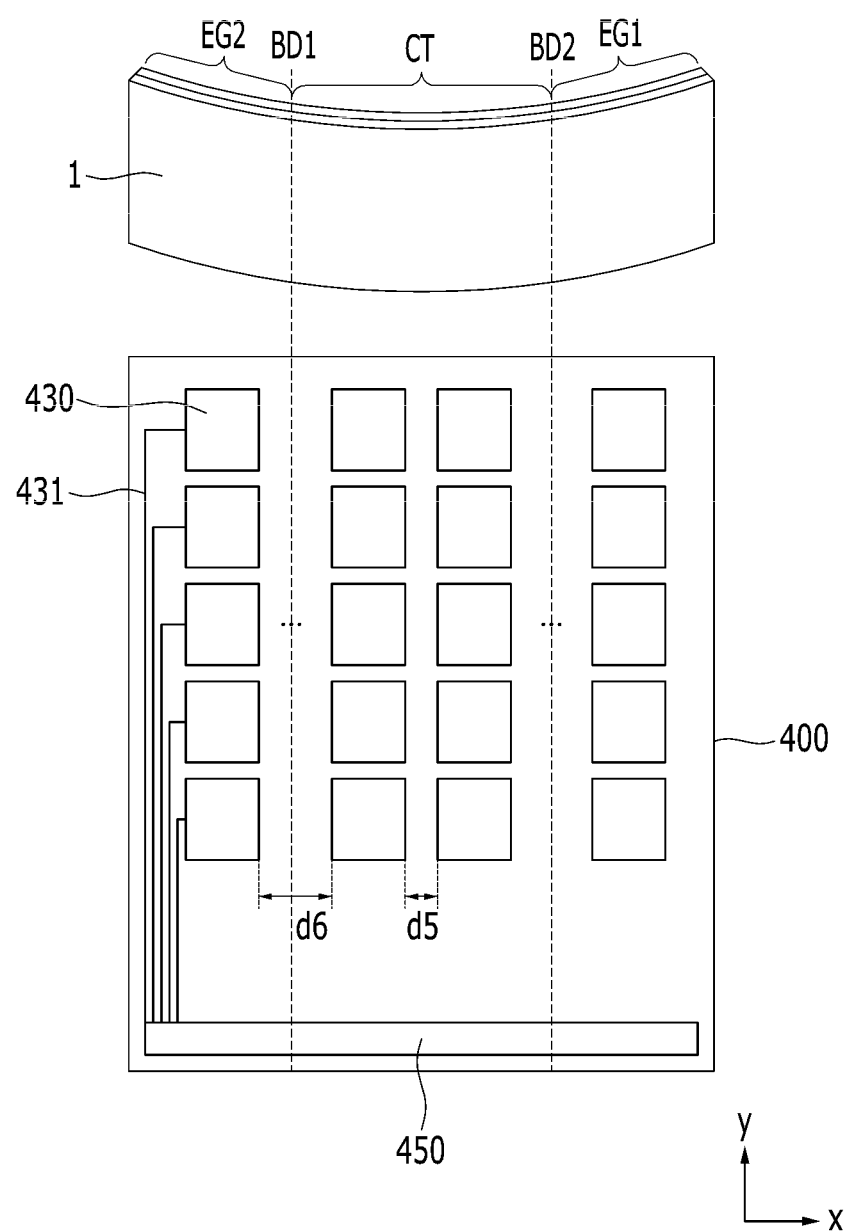

Referring to FIG. 18, the display device 1 according to the exemplary embodiment is almost the same as the display device 1 illustrated in FIG. 14 or 15 described above, with one of the differences being that a distance d5 between the touch electrodes 430 that are positioned at the center region CT and adjacent to each other may be smaller than a distance d6 between the touch electrode 430 positioned at the first edge region EG1 and/or the second edge region EG2 and the closest touch electrode in the center region CT. As a result, since the area ratio occupied by the plurality of touch electrodes 430 positioned at the center region CT per unit area is larger than the area ratio occupied by the plurality of touch electrodes 430 positioned at the first edge region EG1 and/or the second edge region EG2 per unit area, the touch sensitivity of the touch sensor at the center region CT may be higher. In this case, the area of the touch electrode 430 at the center may be equal to or larger than the area of the touch electrode 430 positioned at the first edge region EG1 and/or the second edge region EG2.

The distances d5 and d6 between the adjacent touch electrodes 430 may be within approximately 30 um so as to prevent a user from viewing a space between touch electrodes 430.

Figure 19:
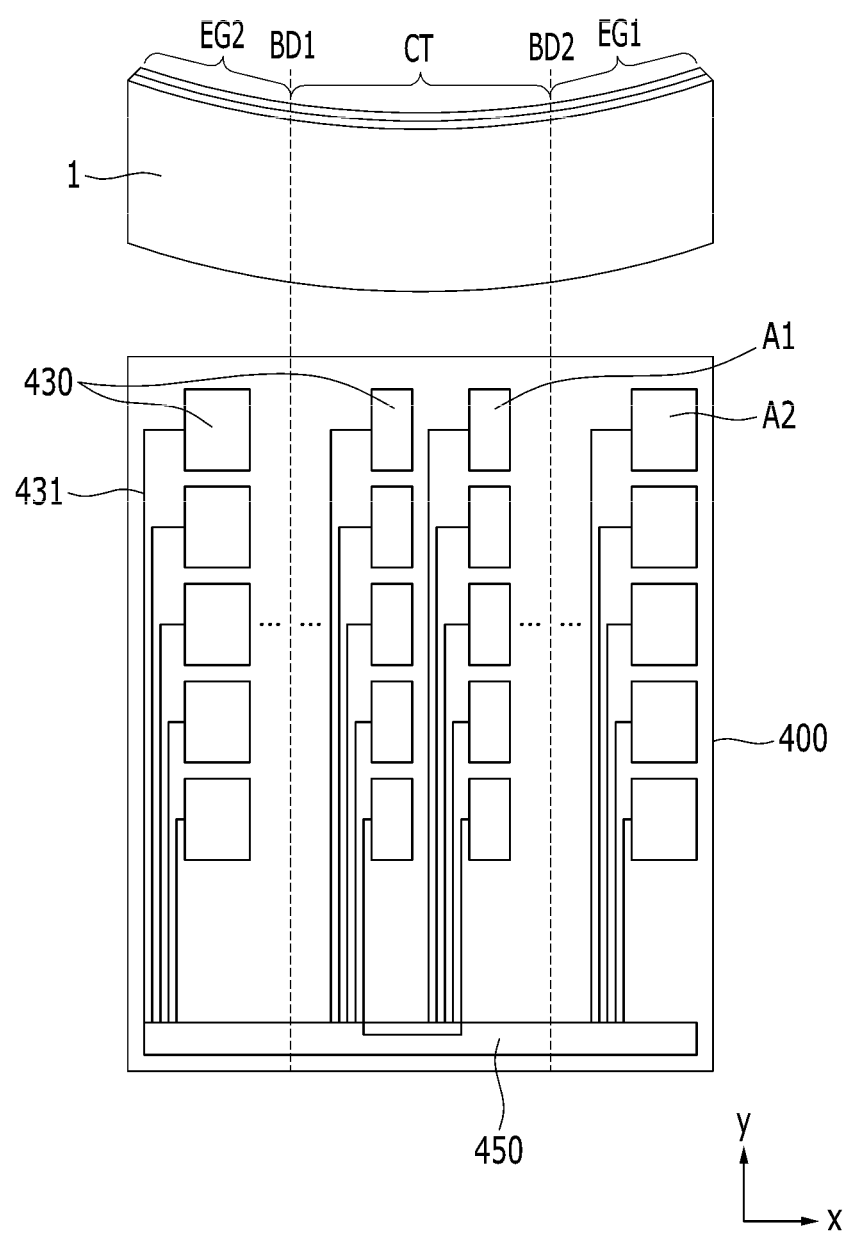

Referring to FIG. 19, the display device 1 according to the exemplary embodiment is similar to the display device 1 illustrated in FIG. 17 described above, with one of the differences being that in the direct touch mode, the touch driver 450 couples touch wires connected to at least two of the plurality of touch electrodes 430 positioned at the center region CT to apply the touch input signal simultaneously. Then, as described above, when the user touches the display device including a structure for standardizing the touch sensitivity in the hovering touch mode in the direct touch mode, the touch sensitivity at the center region CT where the sensitivity of the touch sensor is the higher becomes higher than that at the first edge region EG1 and/or the second edge region EG2. As a result, the touch sensitivity of the entirety of the touch surface 1A may not be uniform. However, according to the exemplary embodiment, since at least two touch sensors positioned at the center region CT are coupled and the touch input signals are simultaneously applied to the touch sensors to drive the touch sensors, the touch sensitivity of the entirety of the touch surface 1A may be uniformly readjusted.

Figure 20:
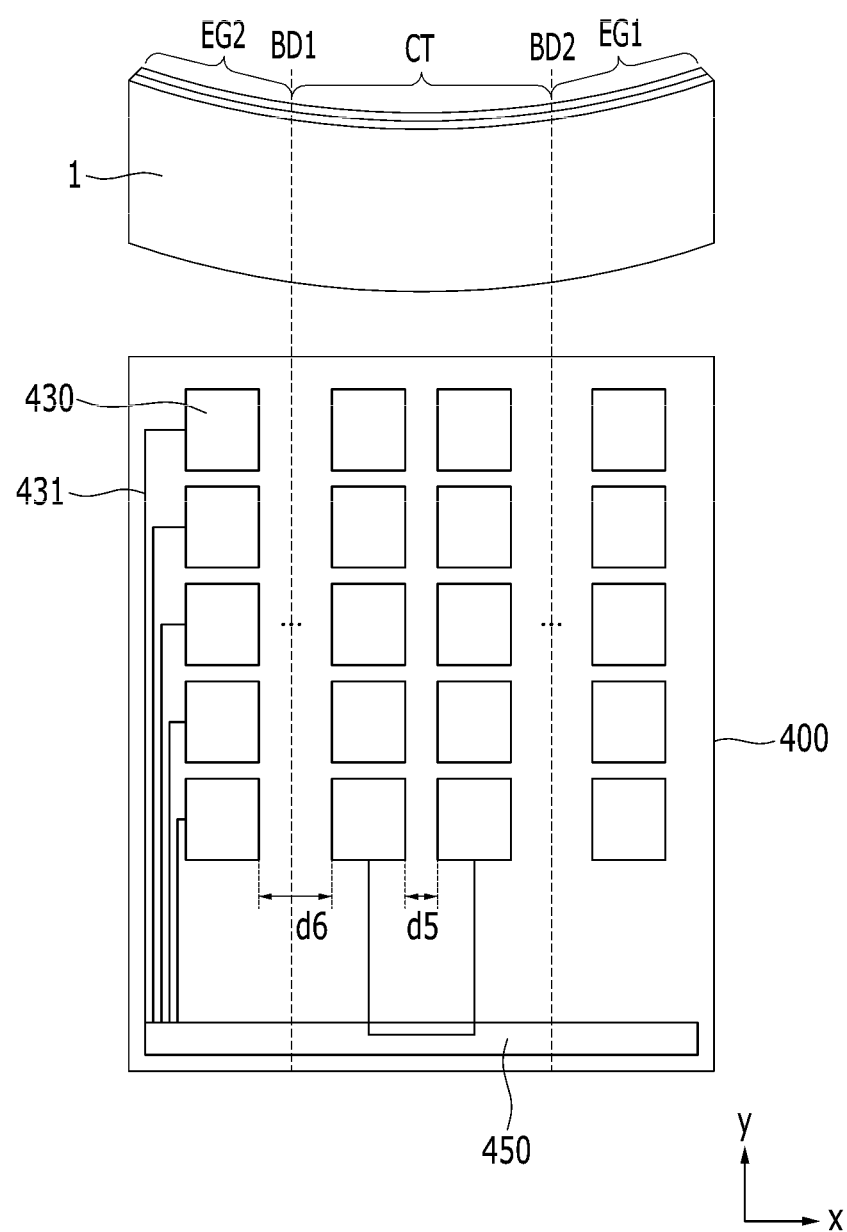

Referring to FIG. 20, the display device 1 according to the exemplary embodiment is similar to the display device 1 illustrated in FIG. 18 described above, with one of the differences being that in the direct touch mode, the touch driver 450 couples touch wires connected to at least two electrodes of the plurality of touch electrodes 430 positioned at the center region CT to apply the touch input signal simultaneously. The resulting effect is similar to that in the description of the exemplary embodiment illustrated in FIG. 19.

Figure 21:
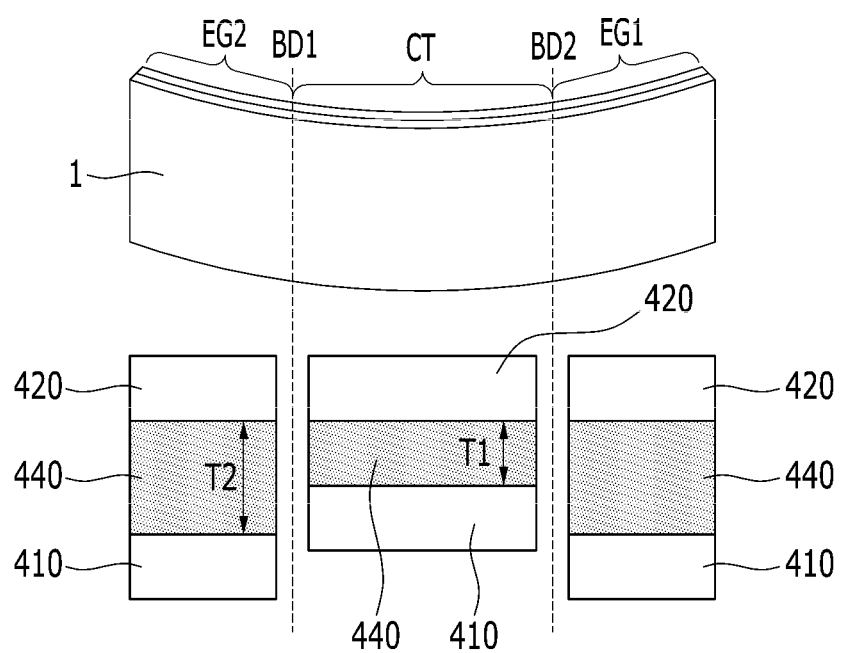
FIG. 21 is a cross-sectional view of the touch sensor unit of the curved display device according to the exemplary embodiment of the present inventive concept.
Figure 22:
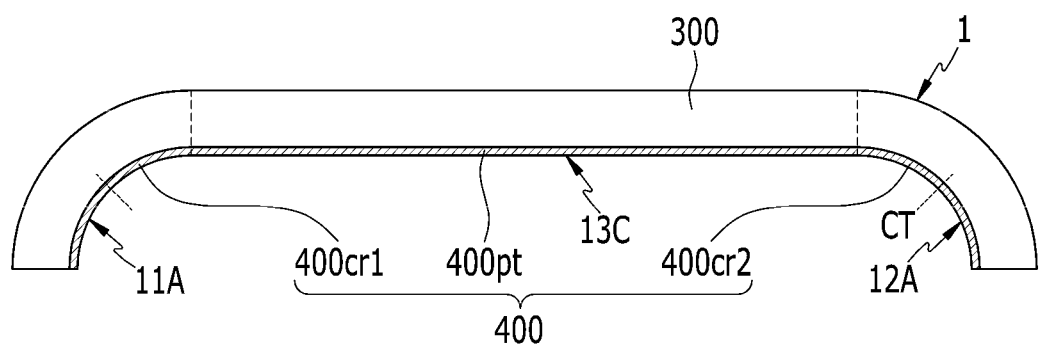
FIG. 22 is a cross-sectional view illustrating a curved shape of the curved display device according to the exemplary embodiment of the present inventive concept.

Referring to FIG. 21, the display device 1 according to the exemplary embodiment is almost the same as the display device 1 illustrated in FIGS. 4 and 13 described above, with one of the differences being that an insulating layer 440 is positioned between the first touch electrode 410 and the second touch electrode 420.

According to the exemplary embodiment, a thickness T1 of the insulating layer 440 included in the touch sensor positioned to correspond to the center region CT may be different from a thickness T2 of the insulating layer 440 included in the touch sensor positioned at the first edge region EG1 and/or the second edge region EG2. In more detail, the thickness T1 of the insulating layer 440 included in the touch sensor positioned to correspond to the center region CT may be smaller than the thickness T2 of the insulating layer 440 included in the touch sensor positioned at the first edge region EG1 and/or the second edge region EG2. As a result, capacities of inter-sensing capacitors formed by the first touch electrode 410 and the second touch electrode 420 at the center region CT are larger than capacities of inter-sensing capacitors formed by the first touch electrode 410 and the second touch electrode 420 at the first edge region EG1 and/or the second edge region EG2, and as a result, the touch sensitivity of the touch sensor positioned to correspond to the center region CT of the touch surface 1A may be higher than the sensitivity of the touch sensor positioned to correspond to the first edge region EG1 and/or the second edge region EG2.

A planar distance between the adjacent first touch electrode 410 and second touch electrode 420 positioned to correspond to the center region CT may be substantially the same as a planar distance between the adjacent first touch electrode 410 and the second touch electrode 420 positioned to correspond to the first edge region EG1 and/or the second edge region EG2.

Hereinafter, a curved structure of the display device 1 according to the exemplary embodiment will be described with reference to FIGS. 22 to 23.

FIG. 22 is a cross-sectional view illustrating a curved shape of the curved display device according to the exemplary embodiment. FIG. 23 is a cross-sectional view illustrating the curved shape of the curved display device according to the exemplary embodiment.

First, referring to FIG. 22, the display device 1 according to the exemplary embodiment is the same as the display device 1 according to the exemplary embodiment described above, but both the display devices 1 may include a first touch surface 11A and a second touch surface 12A that are curved. Each of the first touch surface 11A and the second touch surface 12A may be similar to the touch surface 1A according to various exemplary embodiments described above.

A third touch surface 13C may be positioned between the first touch surface 11A and the second touch surface 12A. The first touch surface 11A and the second touch surface 12A may be connected to both sides of the third touch surface 13C. The third touch surface 13C may have a flat surface unlike the touch surface 1A according to the exemplary embodiment.

The touch sensor unit 400 according to the exemplary embodiment may include a first portion 400cr1 corresponding to the first touch surface 1A, a second portion 400cr2 corresponding to the second touch surface 12A, and a third portion 400pt corresponding to the third touch surface 13C. The touch sensor unit 400 may be positioned on the top surface of the display panel 300 or included in the display panel 300 as described above. FIG. 22 illustrates an example in which the touch sensor unit 400 is positioned on the top surface of the display panel 300.

The display panel 300 and the touch sensor unit 400 may include curved parts along the first touch surface 11A and the second touch surface 12A and a flat part along the third touch surface 13C.

Figure 23:
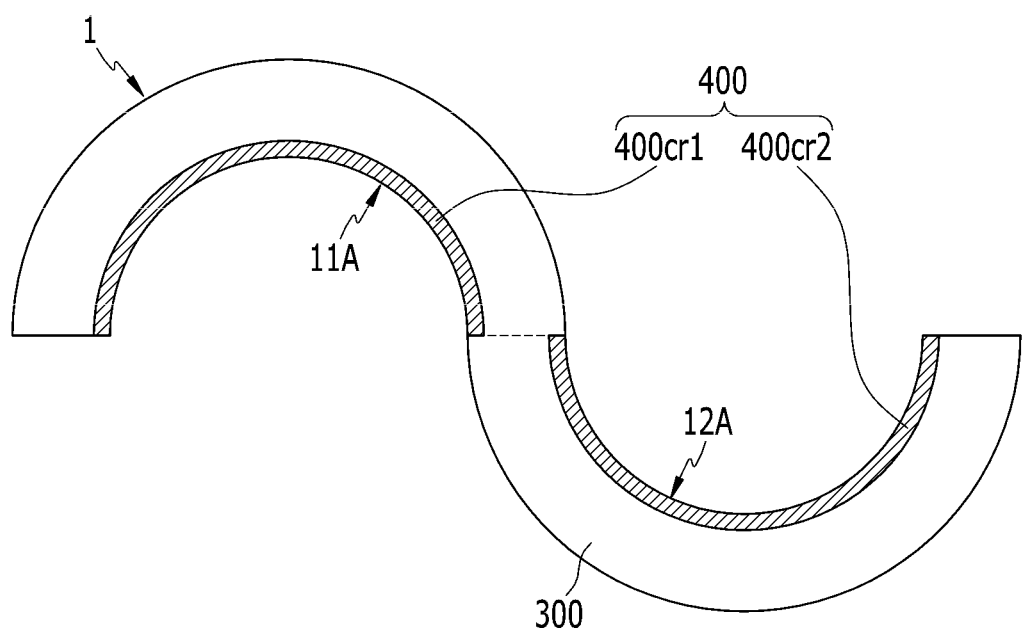
FIG. 23 is a cross-sectional view illustrating a curved shape of the curved display device according to the exemplary embodiment of the present inventive concept.

Referring to FIG. 23, the display device 1 according to the exemplary embodiment may include each of the first touch surface 11A and the second touch surface 12A that are curved. Each of the first touch surface 11A and the second touch surface 12A may be the same as the touch surface 1A according to various exemplary embodiments described above.

A direction facing the first touch surface 11A and a direction facing the second touch surface 12A may be opposite to each other. In this case, the first touch surface 11A and the second touch surface 12A are formed on opposite surfaces of the display device 1.

According to the exemplary embodiment, a direction in which the display panel 300 overlapping the first touch surface 11A and a direction in which the display panel 300 overlapping the second touch surface 12A display images to viewers who are on opposite sides of the display device 1.

The touch sensor unit 400 according to the exemplary embodiment may include the first portion 400cr1 corresponding to the first touch surface 1A and the second portion 400cr2 corresponding to the second touch surface 12A. The first portion 400cr1 and the second portion 400cr2 may be positioned on the same layer or on different layers in the display device 1.

When the touch sensor unit 400 is positioned on a surface that displays the image of the display panel 300 as illustrated in FIG. 23, a surface of the display panel 300 on which the first portion 400cr1 is positioned and a surface of the display panel 300 on which the second portion 400cr2 is positioned may be different from each other.

The display panel 300 and the touch sensor unit 400 may include the curved parts along the first touch surface 11A and the second touch surface 12A.

While this invention has been described in connection with what is presently considered to be practical exemplary embodiments, it is to be understood that the inventive concept is not limited to the disclosed embodiments. On the contrary, the inventive concept is intended to cover various modifications and equivalent arrangements included within the spirit and scope of the disclosure and the appended claims.

DESCRIPTION OF SYMBOLS

1: Display device
300: Display panel
400: Touch sensor unit
410, 420, 430: Touch electrode
450: Touch driver

What is claimed is:
1. An organic light emitting display device comprising:
a display panel comprising a plurality of pixels, a plurality of signal lines and a plurality of thin film transistors, the plurality of pixels including a plurality of light emitting layers between pixel electrodes and an opposed electrode;
an encapsulation layer on the display panel;
an insulating layer on the encapsulation layer; and
a touch sensor unit including a plurality of touch sensors and a plurality of touch wires on the insulating layer, wherein
the display panel is concavely curved along a first direction,
the insulating layer is concavely curved along the first direction,
the encapsulation layer includes at least one inorganic insulating layer and an organic insulating layer,
the touch sensor unit includes a center region and edge regions positioned at both sides of the center region along the first direction,
the display panel is substantially entirely overlapped with the touch sensor unit, and
a sensitivity of the touch sensor in the center region is higher than a sensitivity of the touch sensor in the edge regions in a hovering touch mode.

2. The organic light emitting display device of claim 1, further comprising:
a touch driver for driving the plurality of touch sensors, wherein
a sensing input signal which the touch driver inputs into the touch sensor in the center region has a higher voltage than a sensing input signal which the touch driver inputs into the touch sensors in the edge regions.

3. The organic light emitting display device of claim 1, wherein
the plurality of touch sensors comprises a plurality of first touch electrodes arranged in a second direction on the insulating layer, and a plurality of second touch electrodes arranged in a third direction on the insulating layer, and
the first touch electrodes and the second touch electrodes are on a same layer,
the second touch electrodes are alternately arranged with the first touch electrodes so that the second touch electrodes do not overlap the first touch electrodes in a plan view, and
the first touch electrodes and the second touch electrodes have a substantially polygon shape, respectively.

4. The organic light emitting display device of claim 1, wherein the touch sensors in the center region are not connected to the touch sensors in the edge region.

5. The organic light emitting display device of claim 1, wherein
the plurality of touch sensors comprises a plurality of first touch electrodes arranged in a second direction on the insulating layer, and a plurality of second touch electrodes arranged in a third direction on the insulating layer, and
an area of the first touch electrode in the center region is different from an area of the first touch electrode in the edge region.

6. An organic light emitting display device comprising:
a display panel comprising a plurality of pixels, a plurality of signal lines and a plurality of thin film transistors, the plurality of pixels including a plurality of light emitting layers between pixel electrodes and an opposed electrode;
an encapsulation layer on the display panel;
an insulating layer on the encapsulation layer; and
a touch sensor unit including a plurality of touch sensors and a plurality of touch wires on the insulating layer, wherein
the plurality of touch sensors comprises a plurality of first sense cells arranged in a first direction on the insulating layer, and a plurality of second sense cells arranged in a second direction on the insulating layer,
the display panel has a first portion, a second portion and a third portion, the first portion and the second portion are curved, and the third portion between first portion and second portion is substantially flat,
the insulating layer including the touch sensor unit has a fourth portion, a fifth portion and a sixth portion, the fourth portion and the fifth portion are curved, and the sixth portion between the fourth portion and the fifth portion is substantially flat,
the first portion is substantially entirely overlapped with the fourth portion in a plan view,
the second portion is substantially entirely overlapped with the fifth portion in the plan view,
the third portion is substantially entirely overlapped with the sixth portion in the plan view,
the encapsulation layer includes at least one inorganic insulating layer and an organic insulating layer,
the first sense cells and the second sense cells are on a same layer,
the second sense cells are alternately arranged with the first sense cells so that the second sense cells do not overlap the first sense cells in the plan view,
the first sense cells and the second sense cells have a substantially polygon shape, respectively,
the touch sensors are metal mesh, and
a touch sensing sensitivity at the fourth portion or the fifth portion is different from a touch sensing sensitivity at the sixth portion.

7. The organic light emitting display device of claim 6, wherein an area of the first sense cell in the sixth portion is different from an area of the first sense cell in the fourth portion or the fifth portion.

8. The organic light emitting display device of claim 6, wherein the touch sensing sensitivity at the fourth portion or the fifth portion is lower than the touch sensing sensitivity at the sixth portion.

9. An organic light emitting display device comprising:
a display panel comprising a plurality of pixels, a plurality of signal lines and a plurality of thin film transistors, the plurality of pixels including a plurality of light emitting layers between pixel electrodes and an opposed electrode;
an encapsulation layer on the display panel;
an insulating layer on the encapsulation layer; and
a touch sensor unit including a plurality of touch sensors and a plurality of touch wires on the insulating layer, wherein
the display panel includes a center region and edge regions positioned at both sides of the center region,
the touch sensor unit on the insulating layer includes a center region and edge regions positioned at both sides of the center region,
the encapsulation layer includes at least one inorganic insulating layer and an organic insulating layer,
the display panel is substantially entirely overlapped with the touch sensor unit, and
a touch sensing sensitivity at the center region of the touch sensor unit is different from a touch sensing sensitivity at the edge region of the touch sensor unit.

10. The organic light emitting display device of claim 9, wherein
the plurality of touch sensors comprises a plurality of first touch electrodes arranged in a first direction on the insulating layer, and a plurality of second touch electrodes arranged in a second direction on the insulating layer,
the first touch electrodes and the second touch electrodes are on a same layer,
the second touch electrodes are alternately arranged with the first touch electrodes so that the second touch electrodes do not overlap the first touch electrodes in a plan view, and
the first touch electrodes and the second touch electrodes have a substantially polygon shape, respectively.

11. The organic light emitting display device of claim 10, wherein
an area of the first touch electrode in the center region of the touch sensor unit is different from an area of the first touch electrode in the edge region of the touch sensor unit.

12. The organic light emitting display device of claim 10, wherein
the touch sensing sensitivity at the edge region of the touch sensor unit is lower than the touch sensing sensitivity at the center region of the touch sensor unit.

13. The organic light emitting display device of claim 9, wherein
the plurality of touch sensors comprises a plurality of touch electrodes, each of the touch electrodes disposed at different locations in a plane of the touch sensor unit, and
each of the touch electrodes is connected with each of the touch wires.

14. The organic light emitting display device of claim 13, wherein
an area of the touch electrode in the center region of the touch sensor unit is different from an area of the touch electrode in the edge region of the touch sensor unit.

15. The organic light emitting display device of claim 13, wherein
the touch sensing sensitivity at the edge region of the touch sensor unit is lower than the touch sensing sensitivity at the center region of the touch sensor unit.

16. The organic light emitting display device of claim 9, wherein
the touch sensing sensitivity at the edge region of the touch sensor unit is lower than the touch sensing sensitivity at the center region of the touch sensor unit.

17. An organic light emitting display device comprising:
a display panel comprising a plurality of pixels, a plurality of signal lines and a plurality of thin film transistors, the plurality of pixels including a plurality of light emitting layers between pixel electrodes and an opposed electrode;
an encapsulation layer on the display panel;
an insulating layer on the encapsulation layer; and
a touch sensor unit including a plurality of touch sensors and a plurality of touch wires on the insulating layer, wherein
the display panel includes a center region, a first edge region and a second edge region, the first edge region and the second edge region positioned at both sides of the center region,
the display panel includes a first boundary between the center region and the first edge region,
the display panel includes a second boundary between the center region and the second edge region,
the touch sensor unit on the insulating layer includes a center region and edge regions positioned at both sides of the center region,
the encapsulation layer includes at least one inorganic insulating layer and an organic insulating layer,
the display panel is substantially entirely overlapped with the touch sensor unit, and
a touch sensing sensitivity at the center region of the touch sensor unit is different from a touch sensing sensitivity at the edge region of the touch sensor unit.

18. The organic light emitting display device of claim 17, wherein
the plurality of touch sensors comprises a plurality of first touch electrodes on the first edge region, a plurality of second touch electrodes on the center region and a plurality of third touch electrodes on the second edge region,
the first touch electrodes are not connected to the second touch electrodes, and
the second touch electrodes are not connected to the third touch electrodes.

19. The organic light emitting display device of claim 18, wherein an area of the first touch electrode is different from an area of the second touch electrode.

20. The organic light emitting display device of claim 17, wherein the touch sensing sensitivity at the edge region of the touch sensor unit is lower than the touch sensing sensitivity at the center region of the touch sensor unit.

\* \* \* \* \*